US009439168B2

(12) United States Patent
Rowitch

(10) Patent No.: US 9,439,168 B2
(45) Date of Patent: Sep. 6, 2016

(54) USE OF RF SIGNATURES TO DETECT MOVED WIRELESS TRANSMITTERS

(71) Applicant: QUALCOMM Incorporated, San Diego, CA (US)

(72) Inventor: Douglas Neal Rowitch, Honolulu, HI (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/284,860

(22) Filed: May 22, 2014

(65) Prior Publication Data
US 2015/0341894 A1 Nov. 26, 2015

(51) Int. Cl.
H04W 64/00 (2009.01)
H04W 4/02 (2009.01)
H04B 17/00 (2015.01)
G01S 5/02 (2010.01)

(52) U.S. Cl.
CPC .......... H04W 64/003 (2013.01); G01S 5/0242 (2013.01); H04B 17/0042 (2013.01); H04W 4/025 (2013.01)

(58) Field of Classification Search
CPC ..... H04W 4/02; H04W 88/08; H04W 84/12; H04W 4/028; H04W 8/06; H04W 48/08; H04W 48/20; H04W 4/027; H04W 4/04; H04W 4/06; H04W 64/006; H04W 84/18; H04W 8/20; H04W 36/0016; H04W 36/0055; H04W 40/20; H04W 4/021; H04W 76/007; G01S 5/0236; G01S 5/0242; G01S 5/0252; G01S 5/00; G01S 5/14; G01S 5/30; H04L 67/18; H04L 67/22; G06F 2221/2111; H04M 2242/30; H04M 3/5116; H04M 3/42348; H04M 15/8038; H04H 60/90
See application file for complete search history.

(56) References Cited

U.S. PATENT DOCUMENTS 8,154,454 B2    4/2012  Alizadeh-Shabdiz
8,223,074 B2    7/2012  Alizadeh-Shabdiz
8,242,960 B2    8/2012  Alizadeh-Shabdiz
8,284,103 B2   10/2012  Alizadeh-Shabdiz
2006/0240840 A1* 10/2006 Morgan et al. ............ 455/456.1

(Continued)

OTHER PUBLICATIONS

International Search Report and Written Opinion—PCT/US2015/027024—ISA/EPO—Jul. 24, 2015, 12 pgs.

(Continued)

Primary Examiner — Nizar Sivji
(74) Attorney, Agent, or Firm — Hunter Clark PLLC

(57) ABSTRACT

Location-independent approaches are provided for determining, using a mobile device, whether a wireless transmitter has been moved to a new location. An example method includes obtaining at least a portion of a reference radio frequency (RF) signature database; measuring signals from a plurality of wireless transmitters proximate to the mobile device; identifying a candidate wireless transmitter; deriving an observed radio frequency (RF) signature for the candidate wireless transmitter from signals from at least one wireless transmitter of the plurality of wireless transmitters other than the candidate wireless transmitter; determining whether the candidate wireless transmitter has been moved to a new location by comparing the observed RF signature for the candidate wireless transmitter to a reference RF signature associated with the candidate wireless transmitter; and generating an indicator that the candidate wireless transmitter has been moved responsive to the candidate wireless transmitter having been moved.

30 Claims, 8 Drawing Sheets

Identify Moved Wireless Access Point

(56) References Cited

U.S. PATENT DOCUMENTS

| | | |
|---|---|---|
| 2007/0004428 A1 | 1/2007 | Morgan et al. |
| 2008/0085722 A1 | 4/2008 | Hirano et al. |
| 2008/0267114 A1 | 10/2008 | Mukherjee et al. |
| 2008/0318596 A1 | 12/2008 | Tenny |
| 2010/0120447 A1 | 5/2010 | Anderson et al. |
| 2011/0012780 A1 | 1/2011 | Alizadeh-Shabdiz |
| 2011/0012784 A1 | 1/2011 | Alizadeh-Shabdiz |
| 2012/0129461 A1 | 5/2012 | Venkatraman |
| 2012/0252482 A1 | 10/2012 | Peterson et al. |
| 2012/0280866 A1 | 11/2012 | Alizadeh-Shabdiz |
| 2012/0295635 A1 | 11/2012 | Yokota et al. |
| 2012/0309420 A1 | 12/2012 | Morgan et al. |
| 2013/0072227 A1 | 3/2013 | Morgan et al. |
| 2014/0171126 A1* | 6/2014 | Mayor et al. .............. 455/456.6 |
| 2015/0073703 A1* | 3/2015 | Jouaux et al. ................ 701/465 |
| 2015/0080014 A1* | 3/2015 | Ben-Yosef et al. ........ 455/456.1 |

OTHER PUBLICATIONS

Second Written Opinion from International Application No. PCT/US2015/027024, mailed Apr. 22, 2016, 7 pgs.

International Preliminary Report on Patentability—PCT/US2015/027024—European Patent Office—Berlin, Germany —Jun. 15, 2016—36 pgs.

* cited by examiner

Mobile Device

Location Server

Identify Moved Wireless Access Point

Determine Whether Signature Different (at mobile device)

Updating an RF Signature of an Access Point (at location server)

US 9,439,168 B2

USE OF RF SIGNATURES TO DETECT MOVED WIRELESS TRANSMITTERS

BACKGROUND

Signals from wireless transmitters, such as wireless access points providing wireless local area network (WLAN) connectivity and/or wireless base stations providing Wireless Wide Area Network (WWAN) connectivity (i.e., macrocells, picocells, microcells, and femtocells) can be used to determine the position of a mobile device. Some devices collectively referred to herein as "wireless transmitters" may also be configured to receive wireless signals, such as wireless access points and various types of WWAN base stations.

If a wireless transmitter is moved, position determinations using signals from that wireless transmitter can lead to erroneous position determinations for the mobile device. Detecting that a wireless access point, a wireless base station, or other wireless transmitter has moved is an important problem for mobile positioning techniques that rely on signals from these devices. Conventional approaches for determining whether a wireless transmitter has been moved are location dependent. For example, in one approach, signals received from a wireless transmitter by a mobile device at a known location can be used to approximate the location of the wireless transmitter. Another conventional approach uses location clustering to determine if a wireless transmitter has been moved. In the location clustering approach, signals from a group of wireless transmitters are received by a mobile device and looked up in an almanac to determine a geographic area associated with each of the wireless transmitters. If a particular wireless transmitter of this group is associated with a different geographic area than the rest of the wireless transmitters, then the wireless transmitter associated with the different geographic area has most likely been moved. In yet another conventional approach, an approximation of the location of a wireless transmitter can be determined based on an identifier of a cell coverage area in which the wireless transmitter is determined to be located. If the geographic area associated with the cell coverage area is inconsistent with a geographic area associated with the location of the wireless transmitter in the almanac information, the wireless transmitter has likely been moved.

SUMMARY

An example method for identifying, using a mobile device, that a wireless transmitter has been moved includes obtaining at least a portion of a reference radio frequency (RF) signature database, measuring signals from a plurality of wireless transmitters proximate to the mobile device, identifying a candidate wireless transmitter from the plurality of wireless transmitters, deriving an observed radio frequency (RF) signature for the candidate wireless transmitter from signals from at least one wireless transmitter of the plurality of wireless transmitters other than the candidate wireless transmitter, determining whether the candidate wireless transmitter has been moved to a new location by comparing the observed RF signature for the candidate wireless transmitter to a reference RF signature associated with the candidate wireless transmitter, and generating an indicator that the candidate wireless transmitter has been moved responsive to the candidate wireless transmitter having been moved.

Implementations of such a method may include one or more of the following features. Obtaining at least the portion of the reference RF signature database includes receiving the at least the portion of the reference RF signature database from a location server. Obtaining at least the portion of the reference RF signature database includes accessing the at least the portion of the reference RF signature database in a memory of the mobile device. Sending the indicator that the candidate wireless transmitter has been moved to a location server. Determining whether the candidate wireless transmitter has been moved to the new location by comparing the observed RF signature for the candidate wireless transmitter to the reference RF signature associated with the candidate wireless transmitter includes comparing at least one identifier associated with at least one wireless transmitter of the plurality of wireless transmitters other than the candidate wireless transmitter with at least one identifier of at least one wireless transmitter associated with the reference RF signature. Determining whether the candidate wireless transmitter has been moved to the new location by comparing the observed RF signature for the candidate wireless transmitter to the reference RF signature associated with the candidate wireless transmitter includes comparing a first distance from the candidate wireless transmitter associated with the reference RF signature at which the reference RF signature was generated with a second distance from the candidate wireless transmitter associated with the observed RF signature at which the observed RF signature was generated. Decreasing a weight associated with the candidate wireless transmitter in response to the indicator that the candidate wireless transmitter has moved, the weight indicative of a reliability of a location associated with the candidate wireless transmitter. Determining a new position of the candidate wireless transmitter at the mobile device responsive to the indicator that the candidate wireless transmitter has moved. Comparing the observed RF signature for the candidate wireless transmitter to the reference RF signature associated with the candidate wireless transmitter comprises comparing at least one of (1) received signal strength, or (2) measured path loss associated with the at least one wireless transmitter of the plurality of wireless transmitters other than the candidate wireless transmitter, with, respectively, at least one of (1) received signal strength, or (2) measured path loss associated with at least one transmitter associated with the reference RF signature.

An example apparatus for identifying, using a mobile device, that a wireless transmitter has been moved includes means for obtaining at least a portion of a reference radio frequency (RF) signature database, means for measuring signals from a plurality of wireless transmitters proximate to the mobile device, means for identifying a candidate wireless transmitter from the plurality of wireless transmitters, means for deriving an observed radio frequency (RF) signature for the candidate wireless transmitter from signals from at least one wireless transmitter of the plurality of wireless transmitters other than the candidate wireless transmitter, means for determining whether the candidate wireless transmitter has been moved to a new location by comparing the observed RF signature for the candidate wireless transmitter to a reference RF signature associated with the candidate wireless transmitter, and means for generating an indicator that the candidate wireless transmitter has been moved responsive to the candidate wireless transmitter having been moved.

Implementations of such an apparatus may include one or more of the following features. Means for receiving the at least the portion of the reference RF signature database from a location server. Means for obtaining at least the portion of the reference RF signature database further comprises means for accessing the at least the portion of the reference RF signature database in a memory of the mobile device. Means for sending the indicator that the candidate wireless transmitter has been moved to a location server. The means for determining whether the candidate wireless transmitter has been moved to the new location by comparing the observed RF signature for the candidate wireless transmitter to the reference RF signature associated with the candidate wireless transmitter includes means for comparing at least one identifier associated with at least one wireless transmitter of the plurality of wireless transmitters other than the candidate wireless transmitter with at least one identifier of at least one wireless transmitter associated with the reference RF signature. The means for determining whether the candidate wireless transmitter has been moved to the new location by comparing the observed RF signature for the candidate wireless transmitter to the reference RF signature associated with the candidate wireless transmitter includes means for comparing a first distance from the candidate wireless transmitter associated with the reference RF signature at which the reference RF signature was generated with a second distance from the candidate wireless transmitter associated with the observed RF signature at which the observed RF signature was generated. Means for decreasing a weight associated with the candidate wireless transmitter in response to the indicator that the candidate wireless transmitter has moved, the weight indicative of a reliability of a location associated with the candidate wireless transmitter. Means for determining a new position of the candidate wireless transmitter at the mobile device responsive to the indicator that the candidate wireless transmitter has moved.

An example mobile device for identifying that a wireless transmitter has been moved includes a tangible, non-transitory computer-readable memory, a plurality of modules comprising processor executable code stored in the memory, a processor connected to the memory and configured to access the plurality of modules stored in the memory; and a radio frequency (RF) signature module. The RF signature module is configured to obtain at least a portion of a reference radio frequency (RF) signature database; measure signals from a plurality of wireless transmitters proximate to the mobile device; identify a candidate wireless transmitter from the plurality of wireless transmitters; derive an observed radio frequency (RF) signature for the candidate wireless transmitter from signals from at least one wireless transmitter of the plurality of wireless transmitters other than the candidate wireless transmitter; determine whether the candidate wireless transmitter has been moved to a new location by comparing the observed RF signature for the candidate wireless transmitter to a reference RF signature associated with the candidate wireless transmitter; and generate an indicator that the candidate wireless transmitter has been moved responsive to the candidate wireless transmitter having been moved.

Implementations of such a mobile device may include one or more of the following features. The RF signature module is configured to receive the at least the portion of the reference RF signature database from a location server. The RF signature module is configured to access the at least the portion of the reference RF signature database in a memory of the mobile device. The RF signature module is further configured to send the indicator that the candidate wireless transmitter has been moved to a location server. The RF signature module being configured to determine whether the candidate wireless transmitter has been moved to the new location is further configured to compare at least one identifier associated with at least one wireless transmitter of the plurality of wireless transmitters other than the candidate wireless transmitter with at least one identifier of at least one wireless transmitter associated with the reference RF signature. The RF signature module being configured to determine whether the candidate wireless transmitter has been moved to the new location by comparing the observed RF signature for the candidate wireless transmitter to the reference RF signature associated with the candidate wireless transmitter is further configured to compare a first distance from the candidate wireless transmitter associated with the reference RF signature at which the reference RF signature was generated with a second distance from the candidate wireless transmitter associated with the observed RF signature at which the observed RF signature was generated. The RF signature module being configured to compare the observed RF signature for the candidate wireless transmitter to the reference RF signature associated with the candidate wireless transmitter is configured to compare at least one of (1) received signal strength, or (2) measured path loss associated with the at least one wireless transmitter of the plurality of wireless transmitters other than the candidate wireless transmitter, with, respectively, at least one of (1) received signal strength, or (2) measured path loss associated with at least one transmitter associated with the reference RF signature.

An example non-transitory computer-readable medium has stored thereon computer-readable instructions for identifying, using a mobile device, that a wireless transmitter has been moved. The instructions include instructions that are configured to cause a computer to obtain at least a portion of a reference radio frequency (RF) signature database; measure signals from a plurality of wireless transmitters proximate to the mobile device; identify a candidate wireless transmitter from the plurality of wireless transmitters; derive an observed radio frequency (RF) signature for the candidate wireless transmitter from signals from at least one wireless transmitter of the plurality of wireless transmitters other than the candidate wireless transmitter; determine whether the candidate wireless transmitter has been moved to a new location by comparing the observed RF signature for the candidate wireless transmitter to a reference RF signature associated with the candidate wireless transmitter; and generate an indicator that the candidate wireless transmitter has been moved responsive to the candidate wireless transmitter having been moved.

Implementations of such a non-transitory computer-readable medium may include one or more of the following features. The instructions configured to cause the computer to obtain at least the portion of the reference RF signature database further comprise instructions configured to cause the computer to receive the at least the portion of the reference RF signature database from a location server. The instructions configured to cause the computer to obtain at least the portion of the reference RF signature database further comprise instructions configured to cause the computer to access the at least the portion of the reference RF signature database in a memory of the mobile device. Instructions configured to cause the computer to send the indicator that the candidate wireless transmitter has been moved to a location server. The instructions configured to cause the computer to determine whether the candidate wireless transmitter has been moved to the new location by comparing the observed RF signature for the candidate wireless transmitter to the reference RF signature associated with the candidate wireless transmitter further comprise instructions configured to cause the computer to compare at least one identifier associated with at least one wireless transmitter of the plurality of wireless transmitters other than the candidate wireless transmitter with at least one identifier of at least one wireless transmitter associated with the reference RF signature. The instructions configured to cause the computer to determine whether the candidate wireless transmitter has been moved to the new location by comparing the observed RF signature for the candidate wireless transmitter to the reference RF signature associated with the candidate wireless transmitter further comprise instructions configured to cause the computer to compare a first distance from the candidate wireless transmitter associated with the reference RF signature at which the reference RF signature was generated with a second distance from the candidate wireless transmitter associated with the observed RF signature at which the observed RF signature was generated.

DETAILED DESCRIPTION

Figure 1:
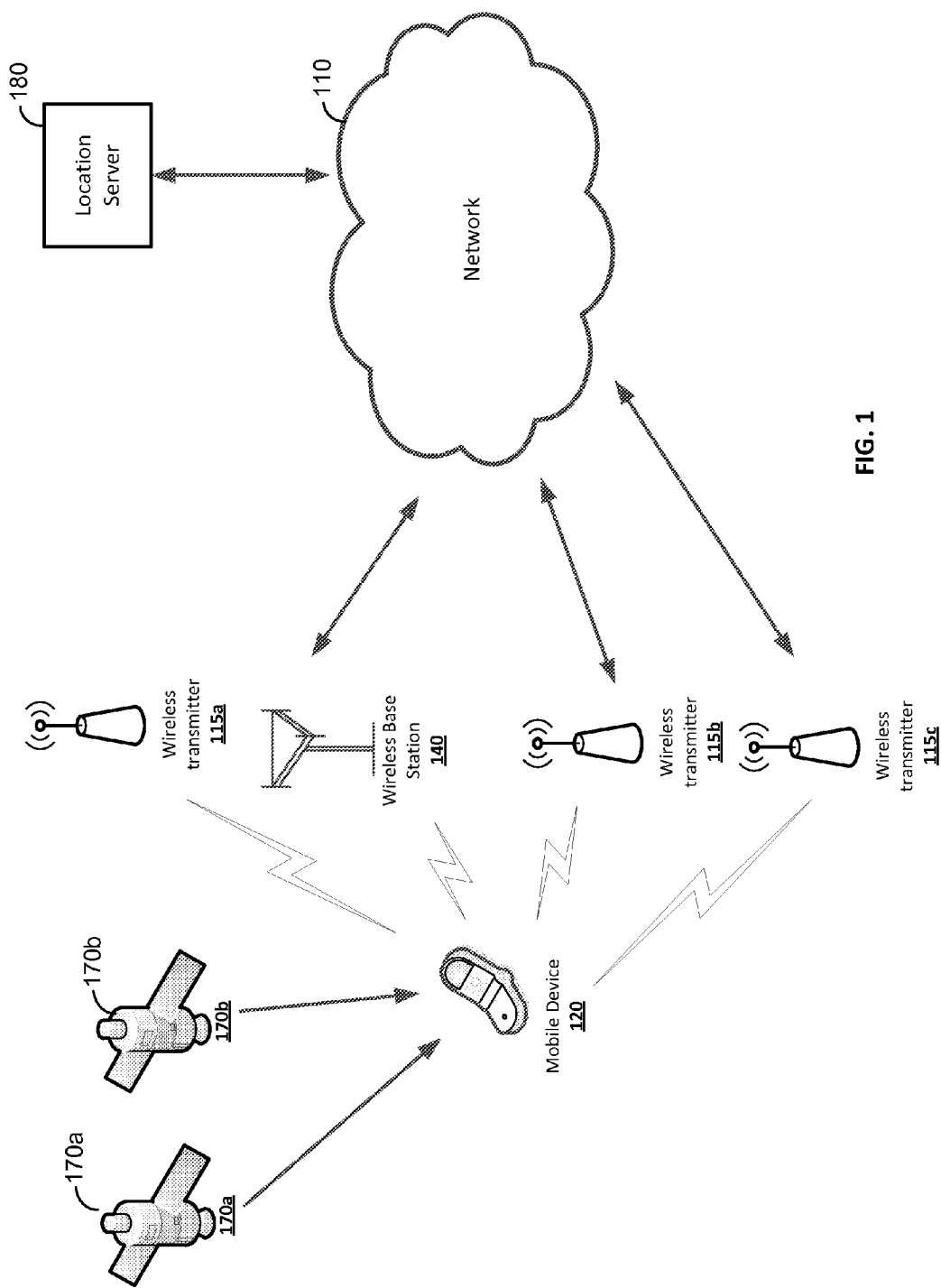
FIG. 1 is a block diagram of an example network architecture in which the techniques discussed herein can be implemented.

Techniques disclosed herein provide a location-independent approach for determining whether a wireless transmitter has been moved to a new location. The location-independent approach disclosed herein can utilize an observed radio frequency (RF) signature of other wireless transmitters proximate to a candidate wireless transmitter to determine whether the candidate wireless transmitter has been moved by comparing the observed RF signature with a reference RF signature. If the candidate wireless transmitter has been moved to a new location, the RF signature of the other wireless transmitters proximate to the candidate wireless transmitter at the new location should no longer match the old RF signature measured at the wireless transmitter's previous location. Accordingly, if the observed RF signature differs from the reference RF signature associated with the candidate wireless transmitter, then the candidate wireless transmitter is likely to have been moved.

In contrast with conventional position-based techniques for determining whether a candidate wireless transmitter has moved, the techniques disclosed herein are location independent. The location of the candidate wireless transmitter does not need to be known in order to determine whether the candidate wireless transmitter has been moved. Instead, the RF signature of other wireless transmitters proximate to candidate wireless transmitter can be used to determine whether the candidate wireless transmitter has been moved. The location of the mobile device and the location of the wireless transmitters involved in making the determination do not need to be known.

A reference RF signature database can be generated by performing a scan of an area in which wireless transmitters are deployed to generate an RF signature for the wireless transmitters. Scans may be scheduled and performed by dedicated mobile devices that are configured to measure RF signal information and to generate a reference RF signature based on signal measurements obtained from wireless transmitters proximate to the mobile device. In other implementations, a crowd sourced approach can be used where mobile devices that are not dedicated for performing mobile scans can be configured to collect RF signal measurements for areas in which wireless transmitters are present. The mobile devices can be configured to generate reference RF signatures for the wireless transmitters and/or send the collected RF signal measurements to a network entity, such as a location server, to generate the reference RF signatures for the wireless transmitters.

The mobile device can be configured to select a candidate wireless transmitter proximate to the mobile device and to collect RF signal measurements from other wireless transmitters proximate to the mobile device and the candidate wireless transmitter. The RF signature comprises a list of other wireless transmitters proximate to the candidate wireless transmitter. Each entry in the list comprises parameters to identify the proximate transmitter (e.g., Cell ID, MAC address) and RF signature parameter information associated with the proximate transmitter. The RF signature can be derived from RSSI (Received Signal Strength Indication) measurements associated with signals produced by the other wireless transmitters proximate to the candidate wireless transmitter for which the RF signature is being generated. The reference RF signature for the candidate wireless transmitter can also be derived from measured path loss associated signals produced by the other wireless transmitters proximate to the candidate wireless transmitter for which the RF signature is being generated. The reference RF signature for the candidate wireless transmitter can also be derived from other types of measurements associated with the other wireless transmitters proximate to the candidate wireless transmitter. For example, the mobile device can be configured to obtain timing measurements such as time of arrival (TOA), observed time difference of arrival (OTDOA), RTT (round-trip time), Angle of Arrival (AOA), and/or Doppler measurements from the other wireless transmitters proximate to the candidate wireless transmitter. The mobile device can also be configured to obtain other types of signal strength measurements and/or timing measurements instead of or in addition to the examples discussed above.

The mobile device can also be configured to scan multiple wireless technologies to collect signal information for the reference RF signature for a candidate wireless transmitter. For example, in some implementations, the mobile device can be configured to scan for signals from WLAN wireless access points and WWAN base stations proximate to the candidate wireless transmitter. The mobile device can be configured to scan for RF signals from other types of wireless transmitters proximate to the candidate wireless transmitter that are configured to operate using one or more of the following wireless communication technologies and/or protocols: Bluetooth, Wireless Personal Area Network (WPAN), Ultra-Wideband (UWB), Radio Frequency Identification (RFID), Near Field Communication (NFC), and broadcast types such as MediaFLO, Integrated Services Digital Broadcasting-Terrestrial (ISDB-T), Digital Video Broadcasting-Handheld (DVB-H), and/or other types of wireless transmission technologies.

The observed RF signatures for a candidate wireless transmitter can be created in a similar fashion as the reference RF signature. The mobile device can identify a candidate wireless transmitter and collect RF signal measurements associated with one or more other wireless transmitters proximate to the candidate wireless transmitter to generate an observed RF signature for the candidate wireless transmitter. The observed RF signature may include all or a subset of the types of information collected in the reference RF signature for the candidate wireless transmitter. The types of measurements included in the RF signature can depend on the capabilities of the mobile device collecting the observed RF signature, and the mobile device collecting the observed RF signature may have a different configuration than the device that collected the reference RF signature information. For example, the mobile device that collected the reference RF signature for a particular candidate wireless transmitter in one particular implementation was configured to operate using multiple wireless communications protocols and collected RF signature information from wireless transmitters proximate to the candidate wireless transmitter that were operating using multiple protocols. However, the mobile device that collects the RF signal measurements used to generate an observed RF signature may not be configured to operate using all of the wireless protocols associated with the signal measurements used to generate the reference RF signature. However, the comparison between the reference RF signature and the observed RF signature can be made using the wireless protocols supported by the mobile device that measured the observed RF signature.

The observed and/or reference RF signatures for wireless transmitters can be captured by mobile devices and provided to a location server or other network entity. The location server or other network entity can collect the RF signatures and compile the RF signatures into RF signature database for the wireless transmitters. Furthermore, the mobile devices can be configured to determine whether a particular wireless transmitter has been moved. A mobile device can be configured to receive assistance data from the location server or other network element. The assistance data can include reference RF signature information for wireless transmitters proximate to the mobile device. For example, the mobile device can be configured to provide a coarse location indicator for the mobile device to the location server, and the location server can be configured to provide the mobile device with reference RF signature information for wireless transmitters located proximate to the coarse location of the mobile device. In some instances, the mobile device may provide a coarse location and/or a coarse location indicator indicative of the coarse location of the mobile device. The coarse location indicator can comprise an approximate location of the mobile device or an identifier that can be used to derive a coarse location, such as Cell ID or other identifier associated with one or more wireless transmitters proximate to the mobile device. The mobile device can be configured to collect observed RF signature information for a candidate wireless transmitter, to compare the observed RF signature information with reference RF signature information associated with that wireless transmitter, and to determine whether the candidate wireless transmitter has moved based on differences between the reference RF signature and the observed RF signature associated with the candidate wireless transmitter. In this comparison, differences can comprise either substantial disparity between the transmitter identifiers between observed and reference signatures or, when the transmitter identifiers are consistent, differences can comprise substantial disparity between the RF signature parameter information between observed and reference RF signatures.

The techniques disclosed herein can also distinguish between wireless transmitters that are wireline access points and mobile wireless access points. A typical wireline access point may be installed in a home or office is typically configured to provide wireless network access to one or more mobile devices, computers, tablets, and/or other devices configured for wireless communication and is configured to be hooked up to a wired broadband connection that serves as a backhaul. In contrast, a mobile wireless access point (which may be a mobile phone or other wireless device, such as a personal WiFi hotspot) can be configured to provide wireless connectivity to one or more mobile devices, computers, tablets, and/or other devices configured for wireless communication via a first wireless connection. The backhaul for a mobile wireless access point is typically provided via a second wireless connection. For example, a personal mobile WiFi hotspot is typically configured to provide WiFi connectivity to one or more WiFi-enabled devices and typically is configured to use a WWAN connection as the backhaul. The RF signatures of such mobile access points can change quite often as the mobile wireless access point is moved to a new location. Accordingly, such mobile wireless access points can be excluded from the reference RF signature database to prevent such devices from being flagged as being moved. One technique that can be used to identify mobile wireless access points is to treat mobile wireless access points the same as any other wireless transmitter for the purposes of the techniques disclosed herein, and if the RF signature associated with wireless transmitter changes more than some threshold number of times, the wireless transmitter can be flagged as a mobile wireless access point and excluded from future determinations whether the wireless transmitter has moved. In some implementations, a wireless transmitter can be flagged as a mobile wireless access point if the wireless transmitter is determined to have moved some predetermined number of times. In some implementations, the wireless transmitter can be flagged as being a mobile wireless access point if the wireless transmitter has moved more than a predetermined number of times within a predetermined period of time. An interface can also be provided that allows a network administrator to change and/or a user to submit a request to change the status of a wireless transmitter that has been marked to as a mobile wireless access point back to a non-mobile status that would once again allow the wireless transmitter to be tracked. In yet other implementations, the wireless transmitter may be associated with a media access control (MAC) address (also referred to herein as a "MAC ID") that indicates that the wireless transmitter is a mobile wireless access point and/or the wireless transmitter may transmit a signaling message that indicates that the wireless access point is a mobile wireless access point. Other techniques may also be used to classify a mobile wireless access point for the purposes of determining whether a wireless transmitter has been moved to a new location described herein.

The techniques disclosed herein can also be applied to wireless base station cell towers, which typically do not change location, but may sometimes change the unique identifiers that are transmitted by the towers. If the RF signature of transmitters located proximate to a tower transmitting a particular unique identifier has changed, then it is likely that the unique identifier is being transmitted by a different base station cell tower. Accordingly, a new location may need to be determined for the base station cell tower transmitting the unique identifier and the almanac information of the location server updated accordingly. Furthermore, a new reference RF signature may need to be determined for both the base station cell tower at the new location and the base station cell tower at the old location (if one still exists).

Some situations do occur where a cell tower of a base station may in fact move, and the techniques disclosed here can be used to identify a cell tower that has moved. For example, some network operators may make use of mobile base stations referred to as a "cell on wheels" or COW that can be deployed to a particular location to provide temporary wireless network coverage and/or capacity. Furthermore, femtocells, picocells, microcells, and small cells may also be referred to as "base stations" and may be moved from one location another in certain instances.

Example Network Environment

FIG. 1 is a block diagram of an example network architecture, which may be suitable for an implementing the techniques discussed herein. The particular configuration illustrated herein is merely an example of one network configuration in which the techniques disclosed herein may be used. Furthermore, an implementation of such a network architecture may include additional elements that are not illustrated herein and have been omitted for the sake of clarity.

The mobile device 120 may also be referred to as a User Equipment (UE), a mobile station, a terminal, an access terminal, a subscriber unit, a station, etc. The mobile device 120 may be a smartphone, a tablet computer, a laptop computer, or other device that includes a wireless transmitter that is configured to communicate using one or more wireless communications protocols, including, but not limited to, the Long Term Evolution (LTE), WiFi, and WiMAX wireless communications protocols. The mobile device 120 can also be configured to support other types of wireless communications protocols and can be configured to support multiple different wireless communications protocols. The wireless transmitter of the mobile device 120 can be configured to send data to and/or receive data from other mobile devices 120, the wireless transmitters 115, and/or the wireless base station 140.

The mobile device 120 can be configured to include a GNSS receiver configured to receive and measure signals from one or more satellites 170 and to obtain pseudo-range measurements for the satellites 170. Satellites 170 may be part of a Global Navigation Satellite System (GNSS), which may be the United States Global Positioning System (GPS), the European Galileo system, the Russian GLONASS system, or some other GNSS. The GNSS receiver may also be configured to detect and receive signals from satellites 170 belonging to more than one GNSS system. For example, satellite 170a could belong to the GPS system while the satellite 170b could belong to the Galileo system. While the example network architecture illustrated herein illustrates only two satellites 170, other implementations may have more or less satellites available, and the number of satellites visible to the mobile device 120 may depend upon the current geographical location of the mobile devices and the orbits of the satellites 170.

The mobile device 120 may also measure signals from one or more wireless base stations or wireless access points, such as the transceivers 115 and the macrocell base station 140, and obtain timing measurements (e.g., for time of arrival (TOA) or observed time difference of arrival (OT-DOA)), signal strength measurements (e.g., Receive Signal Strength Indication (RSSI)), and/or signal quality measurements for the wireless base stations. The mobile device 120 can also be configured to determine path loss associated with signals from one or more wireless base stations or wireless access points. The pseudo-range measurements, timing measurements, signal strength measurements, and/or signal quality measurements may be used to derive a location estimate for the mobile device 120. A location estimate may also be referred to as a position estimate, a position fix, etc. Three terrestrial wireless transmitters are illustrated in this example: 115a, 115b, and 115c. However, in other implementations, more or less wireless transmitters 115 may be included. The mobile device 120 can also be configured to use a combination of signals from one or more of the satellites 170, the macrocell base station 140, and/or the wireless transmitters 140 to determine a position of the mobile device 120.

Each of the wireless transmitters 115 can comprise a WLAN wireless access point, and in some implementations may comprise a femtocell, a picocell, a microcell, or other type of terrestrial transceiver 115. Some network environments may include a more than one type of wireless transmitter 115. The terrestrial transceiver 115 can be connected to network 110 via a backhaul connection that provides a broadband connection to the network 110. The network 110 may be the Internet and/or a combination of one or more networks. For example, the terrestrial transceiver 115 may be connected to a DSL modem or a cable modem, depending upon the type of broadband service being used in that particular implementation. A wireless transmitter 115 can be associated with a mobile communication network provider and can be configured to communicate with the mobile communication network provider's network (not shown) via the network 110. The coverage area of the a wireless transmitter 115 may overlap with that of one or more macrocell base stations, such as macrocell base station 140, or that of one or more other terrestrial transceivers.

The wireless transmitters 115 may in some instances be moved to a new location. Moving a wireless transmitter 115 to a new location can present a problem when the mobile device 120 uses signals received from the wireless transmitter 115 but location information associated with the moved wireless transmitter 115 has not been updated. For example, the mobile device 120 may rely on almanac information or other information provided by the location server 180 that provides positional information for one or more wireless transmitters 115 and/or wireless base stations 140. If a wireless transmitter is relocated, or in some instances assigned a new identifier, the location information associated with wireless transmitters 115 maintained by the location server 180 may not be updated accordingly. If the location server 180 or a mobile device 120 relies on the outdated location information in determine the position of the mobile device 120, determining the position of the mobile device using signals from a moved wireless transmitters 115 introduce significant errors in the position solution.

The wireless base station 140 can be configured to provide wireless network connectivity to a plurality of mobile devices 120. The wireless base station 140 may comprise a macrocell base station or other type of base station that is less likely to be relocated or reconfigured with a new network identifier than the wireless transmitters 115. The wireless base station 140 may have a much larger coverage area than the terrestrial transceiver 115 or may be a terrestrial transceiver that provides a coverage area that is of a similar size or of a smaller size than the coverage area provided by the terrestrial transceiver 115. Wireless base station 140 can be configured to communicate using one or more wireless communications protocols. While the example illustrated in FIG. 1 includes on a single wireless base station 140, in other implementations the network environment is likely to include more than wireless base station 140 which have coverage areas that may overlap at least in part.

The location server 180 can be configured to provide location services to the mobile device 120. For example, the location server 180 can be configured to provide almanac information and/or other information that the mobile device 120 can use to determine the position of the mobile device 120. The location server 180 can also be configured to assist the mobile device 120 in determining the position of the mobile device 120. For example, the location server 180 can be configured to receive signal measurements of signals received at the mobile device 120 from wireless transmitters 115 and/or wireless base stations 140 and to determine a position of the mobile device 120 based on those signals. The location server 180 may be configured to provide reference RF signal information to the mobile device 120 that the mobile device 120 can use to determine whether one or more candidate wireless transmitters 115 proximate to the mobile device 115 have been moved. The location server 180 can also be configured to receive updated reference RF signature information from the mobile device 120 where the mobile device 120 has determined that one or more of the candidate wireless transmitters 115 proximate to the mobile device 115 have been moved. The location server 180 can be configured to update a database of RF signature information associated with wireless transmitters 115 based on the updated RF signature information received from the mobile device 120. In some implementations, the location server 180 can also be configured to receive signal measurements of signals received at the mobile device 120 from wireless transmitters 115 and/or wireless base stations 140 and to generate an observed RF signature for one or more candidate wireless transmitters 115.

The example network configuration illustrated in FIG. 1 is merely an example of one possible configuration of a network in which the techniques disclosed herein may be implemented. Other network configurations may include additional elements not illustrated in FIG. 1 and the various components may be interconnected in a different configuration than what is shown in FIG. 1.

Example Hardware

Figure 2:
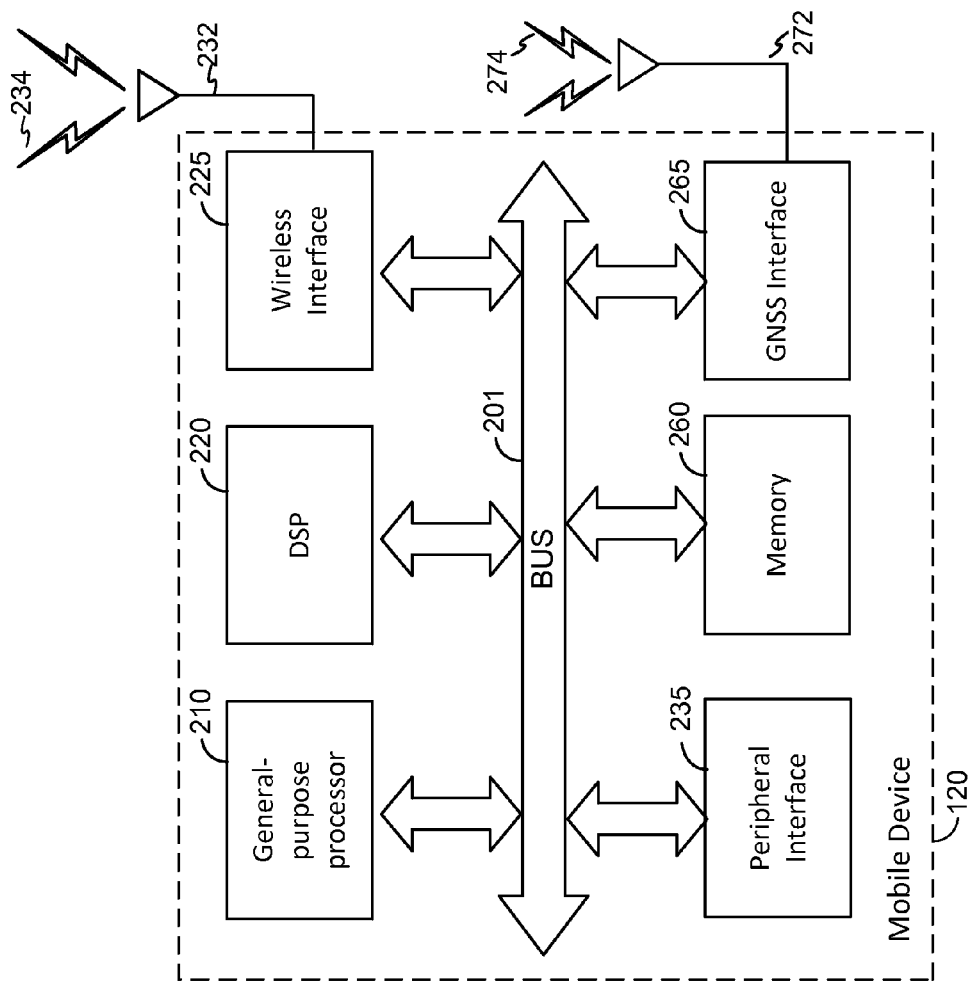
FIG. 2 is a block diagram of a mobile device that can be used to implement the mobile device illustrated in FIG. 1.

FIG. 2 is a block diagram of a mobile device that can be used to implement the mobile device 120 illustrated in FIG. 1. The mobile device 120 can be used to implement, at least in part, the processes illustrated in FIGS. 6-8.

The mobile device 120 comprises a computer system including a general-purpose processor 210, a digital signal processor (DSP) 220, a wireless interface 225, a peripheral interface 235, a GNSS interface 265, and a non-transitory memory 260, connected to each other by a bus 201. Other implementations of the mobile device 120 may include additional elements not illustrated in the example implementation of FIG. 2 and/or may not include all of the elements illustrated in the example embodiment illustrated in FIG. 2. For example, some implementations of the mobile device 120 may not include the GNSS interface 265.

The wireless interface 225 can include a wireless receiver, transmitter, transceiver, and/or other elements that enable the mobile device 120 to send and/or receive data using WWAN WLAN, and/or other wireless communication protocols. For example, the wireless interface 225 of the mobile device 120 can be configured to send and/or receive RF signals using one or more of the following wireless communication technologies and/or protocols: Bluetooth, Wireless Personal Area Network (WPAN), Ultra-Wideband (UWB), Radio Frequency Identification (RFID), Near Field Communication (NFC), and broadcast types such as Media-FLO, Integrated Services Digital Broadcasting-Terrestrial (ISDB-T), Digital Video Broadcasting-Handheld (DVB-H), and/or other types of wireless transmission technologies.

The wireless interface 225 can comprise one or more multi-mode modems capable of transmitting and receiving wireless signals using multiple wireless communications standards. The wireless interface 225 is connected by a line 232 to an antenna 234 for sending and receiving communications to/from the wireless transmitters 115, the wireless base station 140, and/or other wireless devices configured to communicate using wireless communication protocols. While the mobile device 120 illustrated in FIG. 2 comprises a single wireless interface 225 and a single antenna 234, other implementations of the mobile device 120 can include multiple wireless interfaces 225 and/or multiple antennas 234.

The GNSS interface 265 can include a wireless receiver and/or other elements that enable the mobile device 120 to receive signals from transmitters associated with one or more GNSS systems. The GNSS interface 265 is connected by a line 272 to an antenna 274 for receiving signals from the GNSS transmitters, such as the satellites 170 illustrated in FIG. 1. The mobile device 120 can be configured to use signals received from satellites associated with satellites and other transmitters associated with the GNSS systems to determine a position of the mobile device 120. The mobile device 120 can also be configured to use the signals received from the satellites and other transmitters associated with the GNSS systems in conjunction with signals received from wireless transmitters 115 and/or wireless base stations 140 to determine a position of the mobile device 120.

The DSP 220 can be configured to process signals received from the wireless interface 225 and/or the GNSS interface 265 and may be configured to process signals for or in conjunction with one or more modules implemented as processor-readable, processor-executable software code stored in memory 260 and/or may be configured process signals in conjunction with the processor 210.

The processor 210 can be an intelligent device, e.g., a personal computer central processing unit (CPU) such as those made by Intel® Corporation or AMD®, a microcontroller, an application specific integrated circuit (ASIC), etc. The memory 260 is a non-transitory storage device that can include random access memory (RAM), read-only memory (ROM), or a combination thereof. The memory 260 can store processor-readable, processor-executable software code containing instructions for controlling the processor 210 to perform functions described herein (although the description may read that the software performs the function(s)). The software can be loaded onto the memory 260 by being downloaded via a network connection, uploaded from a disk, etc. Further, the software may not be directly executable, e.g., requiring compiling before execution.

The software in the memory 260 is configured to enable the processor 210 to perform various actions, including implementing sending and/or receiving data from the wireless transmitters 115, the wireless base station 120, other mobile devices 120, and/or other devices configured for wireless communication.

The peripheral interface 235 can be configured to allow the mobile device 120 to be connected to one or more peripheral devices, such as a keyboard or other external input device, an external data storage device, or a power supply for charging a batter of the mobile device 120. The peripheral interface 235 can be configured to provide wired and/or wireless connectivity between the mobile device 120 and the one or more peripheral devices. For example, the peripheral interface 235 can be configured to wirelessly send data to and/or receive data from one or more peripheral devices using one or more other wireless protocols, such as Bluetooth, Near Field Communication (NFC), and/or other wireless communications protocols. The peripheral interface 235 may be configured to send data to and/or receive data from one or more peripheral devices over a wired connection using one or more other wireless protocols, such as a universal serial bus (USB) connection, a FireWire connection, and/or other wired communication protocols.

Figure 3:
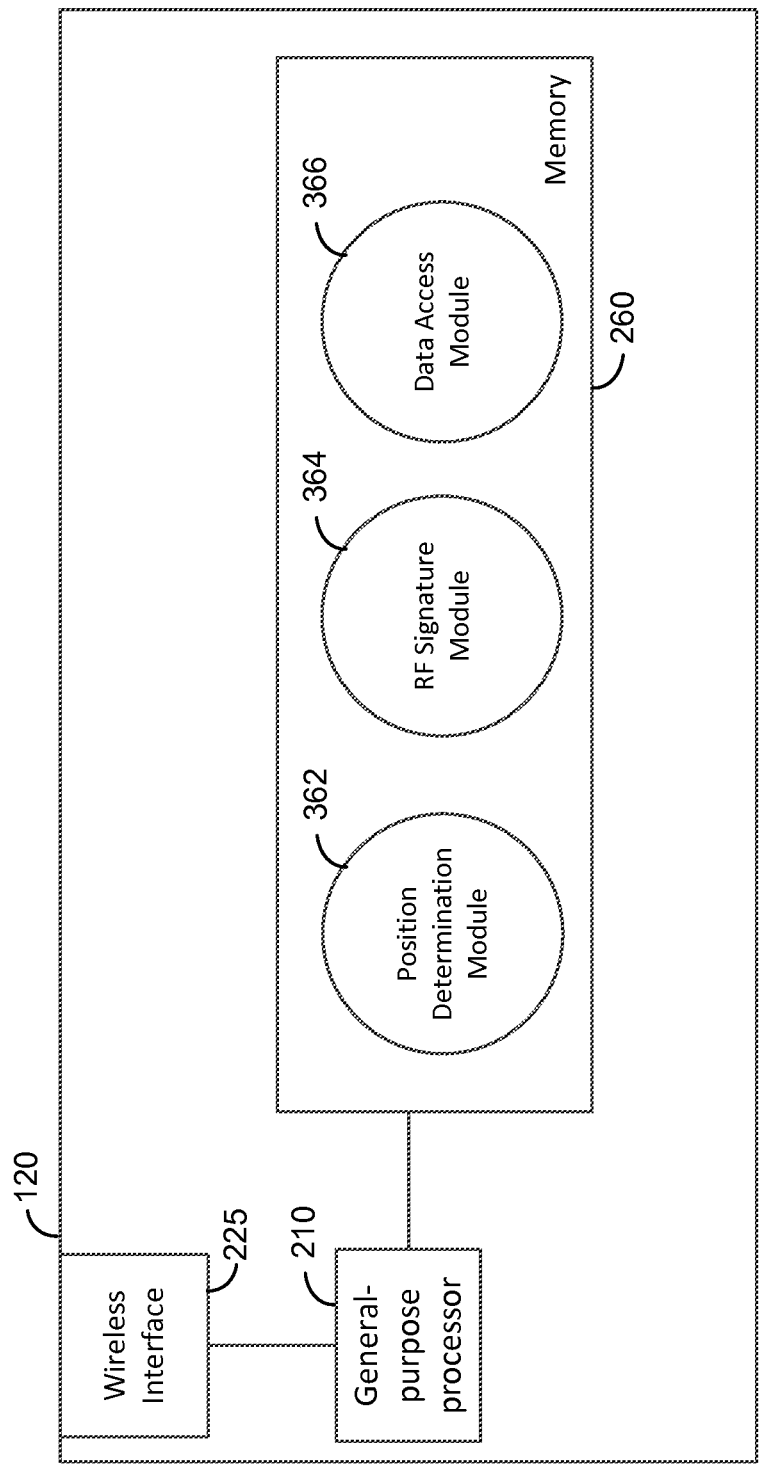
FIG. 3 is a functional block diagram of the mobile device illustrated in FIG. 2 that illustrates functional modules of a memory shown in FIG. 2.

FIG. 3 is a functional block diagram of the mobile device 120 illustrated in FIG. 2 that illustrates functional modules of a memory 260 shown in FIG. 2. For example, the mobile device 120 can include a position determination module 362 and a RF signature module 364. The mobile device 120 may also include one or more additional functional modules that provide other functionality to the mobile device 120. The mobile device 120 illustrated in FIGS. 2 and 3 can be used to implement the mobile device 120 associated with the processes illustrated in FIGS. 6-8.

The position determination module 362 can be configured to determine a position of the mobile device 120 and/or of one or more wireless transmitters 115. For example, the position determination module 362 can be configured to receive pseudorange data from the GNSS interface 265 and use the pseudorange data to determine a position of the mobile device 120. The position determination module 362 can also be configured to request and receive assistance data from a network entity, such as the location server 180. The position determination module 362 can also be configured to use measurements of signals received from wireless base stations 140 and/or wireless transmitters 115 to determine a position of the mobile device 120. The position determination module 362 can also be configured to use pseudorange information from the GNSS interface 265 and measurements of signals received from wireless base stations 140 and/or wireless transmitters 115 to determine a position of the mobile device 120. The position determination module 362 can be configured to determine the position of the mobile device in response to a request from an application running on the mobile device, in response to an external entity (such as the location server) requesting a position of the mobile device, or in response to a request from another module of the mobile device.

The RF signature module 364 can be configured to request and/or receive reference RF signature data from the location server 180 and/or another network entity. The RF signature module 364 can also be configured to access reference RF signature data stored in memory 260 and/or other data storage device associated with the mobile device via the data access module 366. The RF signature module can be configured to access a stored reference RF signature, to compare the observed RF signature for the candidate wireless transmitter 115 with a reference RF signature associated with the candidate wireless transmitter 115, and to determine whether the candidate wireless transmitter 115 has moved. The RF signature module 364, when comparing the observed RF signature for a candidate wireless transmitter 115 to the reference RF signature associated with the candidate wireless transmitter 115, can be configured to compare at least one of (1) received signal strength, or (2) measured path loss associated with the at least one wireless transmitter of a plurality of wireless transmitters other than the candidate wireless transmitter 115, with, respectively, at least one of (1) received signal strength, or (2) measured path loss associated with at least one transmitter associated with the reference RF signature. The RF signature module 364 can also be configured to compare other types of observed signal measurements, including but not limited RTT and TOA measurements, with reference RF signature information to determine whether the candidate wireless transmitter 115 has moved.

The RF signature module 364 can also be configured to provide updated RF signature information to the location server 180 or another network entity in response to the RF signature module 364 determining that a candidate wireless transmitter 115 has been moved. For example, the RF signature module 364 can be configured to set a flag or other indicator in the RF signature information indicating that the candidate wireless transmitter 115 has been moved. The position determination module 362 can be configured to use this indicator to: (a) exclude the candidate transmitter from position calculations, (b) attempt to determine the an updated position for the transmitter and/or (c) attempt to request an updated position for the transmitter from the location server The position determination module 362 can also be configured to adjust the weight associated with a candidate wireless transmitter 115 in response to receiving an indicator that the candidate wireless transmitter 115 has moved, and the position determination module 362 can be configured use the weight an indicator of the reliability of the location of the candidate wireless transmitter 115 when using signals from the candidate wireless transmitter 115 to determine a position of the mobile device 120. In some implementations, the RF signature module 364 can be configured to provide an indicator that the candidate wireless transmitter 115 has moved directly to the location server and the location server 180 can be configured to use this information to update RF signature information maintained by the location server 180. Various approaches to determine the updated position of a candidate wireless transmitter 115 can be used once the determination has been made that the candidate wireless transmitter 115 has been moved, such as wardriving, crowd sourcing, site survey, and/or other techniques.

The RF signature module 364 can be configured to scan for wireless transmitters 115 proximate to the mobile device 120 on demand and make a determination whether the wireless transmitters 115 have moved. For example, the RF signature module 364 can be configured perform such a scan and determination in response to a request from the location server 180 or another network entity, in response to a request from an application running on the mobile device 120, in response to a request from the positioning module 362, or in response to a user request. The RF signature module 364 can also be configured to perform such a scan and determination in response to a trigger condition being satisfied or a predetermined event occurring. For example, the RF signature module 364 can be configured to perform a scan when the mobile device 120 enters a predetermined area, such as an airport, shopping mall, train station, airport, or other location that includes a plurality of wireless transmitters 115 that may be used for position determination by the mobile device 120 and/or for wireless communications by the mobile device 120. In some implementations, the RF signature module 364 can also be configured to perform a scan and determination in response to the positioning module 362 producing an anomalous positioning result. For example, if the positioning module 362 relied on measurements of signals received from one or more wireless transmitters 115 that have been moved but are still associated location information representing a previous location of the one or more wireless transmitters 115, the position determined by the mobile device 120 may be incorrect.

The data access module 366 can be configured to store data in the memory 260 and/or other data storage devices associated with the mobile device 120. The data access module 366 can also be configured to access data in the memory 260 and/or other data storage devices associated with the mobile device 120. The data access module 366 can be configured to receive requests from other modules and/or components of the mobile device 120 and to store and/or access data stored in the memory 260 and/or other data storage devices associated with the mobile device 120.

Figure 4:
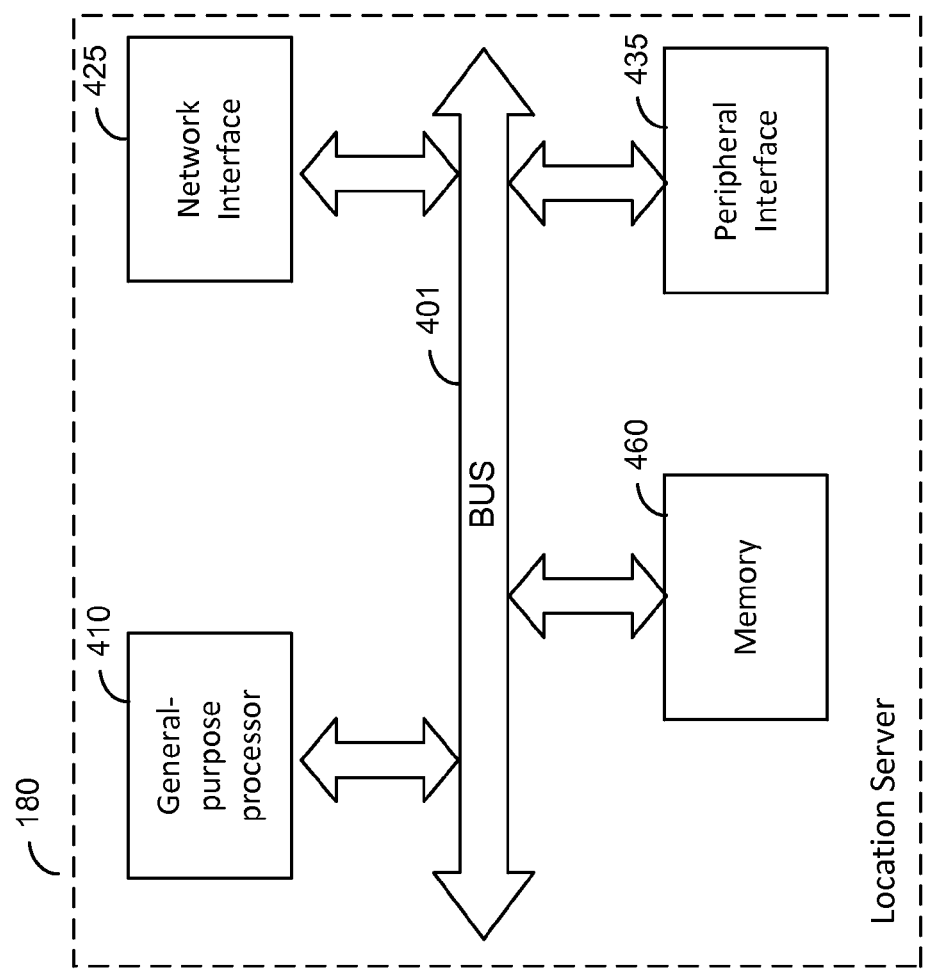
FIG. 4 is an example of a computer system that can be used to implement the techniques disclosed herein.
Figure 6:
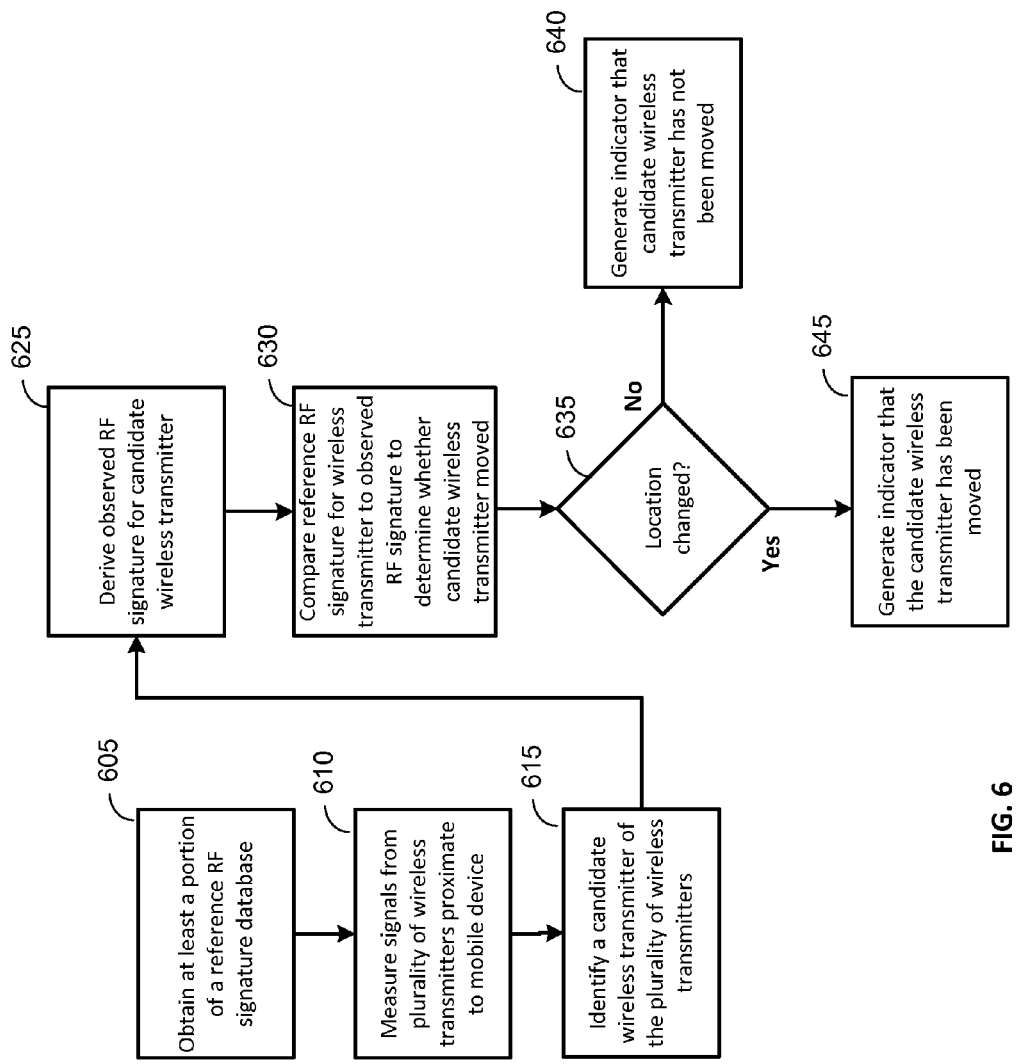
FIG. 6 is a flow diagram of a process that can be used to identify a wireless access point that has been moved.
Figure 7:
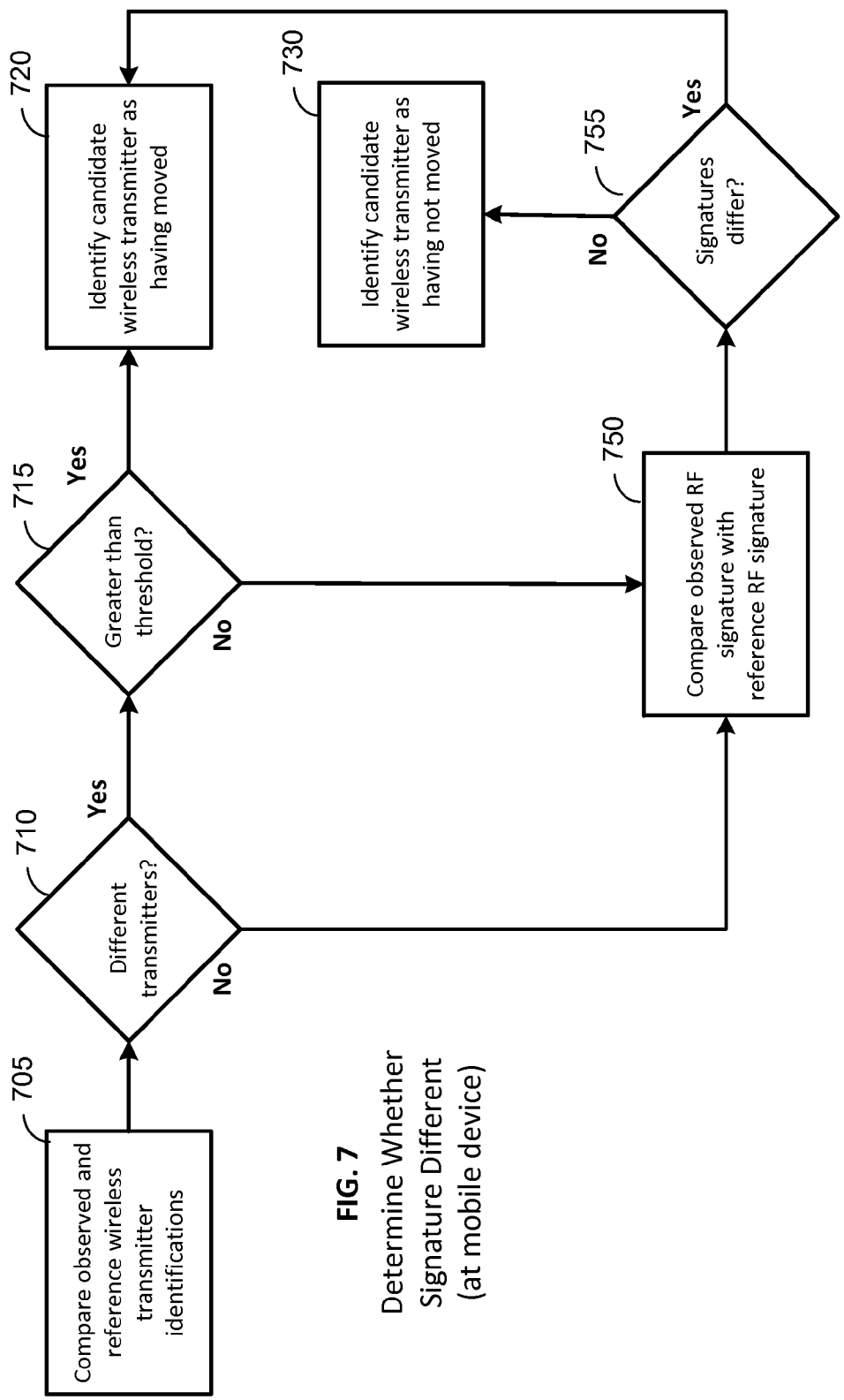
FIG. 7 is a flow diagram of a process that can be used to determine whether a wireless access point that has been moved.
Figure 8:
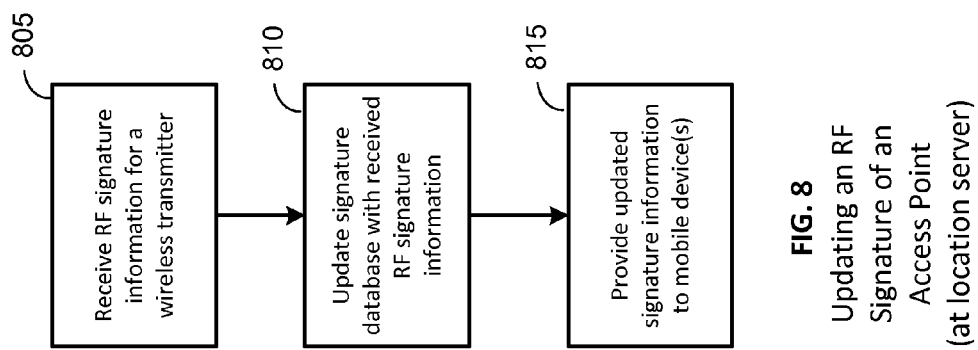
FIG. 8 is a flow diagram of a process that can be used to update a signature associated with a wireless access point.

FIG. 4 is a block diagram of a location server 180 that can be used to implement at least in part, the processes illustrated in FIGS. 6-8 associated with a location server.

The location server 180 comprises a general-purpose processor 410, a wireless interface 425, a peripheral interface 435, and a non-transitory memory 460, connected to each other by a bus 401. The network interface 425 provides a wired and/or wireless network interface for the location server 180 that allows the location server 180 to send and/or receive data via one or more network connections.

The peripheral interface 435 is configured to allow the location server to be connected to one or more peripheral devices. The peripheral interface 435 can provide wired and/or wireless connectivity between the location server 180 and peripheral devices, such as keyboards, displays, input-output devices, and/or external data storage devices. For example, the peripheral interface can be configured to wirelessly send data to and/or receive data from one or more peripheral devices using one or more other wireless protocols, such as Bluetooth, Near Field Communication (NFC), and/or other wireless communications protocols. The peripheral interface may be configured to send data to and/or receive data from one or more peripheral devices over a wired connection using one or more other wireless protocols, such as a universal serial bus (USB) connection, a FireWire connection, and/or other wired communication protocols.

The processor 410 can be an intelligent device, e.g., a personal computer central processing unit (CPU), a microcontroller, an application specific integrated circuit (ASIC), etc. The memory 460 is a non-transitory storage device that can include random access memory (RAM), read-only memory (ROM), or a combination thereof. The memory 460 can store processor-readable, processor-executable software code containing instructions for controlling the processor 410 to perform functions described herein (although the description may read that the software performs the function(s)). The software can be loaded onto the memory 460 by being downloaded via a network connection, uploaded from a disk, etc. Further, the software may not be directly executable, e.g., requiring compiling before execution.

The software in the memory 460 is configured to enable the processor 410 to perform various actions, including determining a position of the mobile device 120, determining whether a wireless transmitter 115 has moved by comparing an observed RF signature for the wireless transmitter 115 with a reference RF signature for the wireless transmitter 115, and determining a position of the wireless transmitter 115 that has moved.

Figure 5:
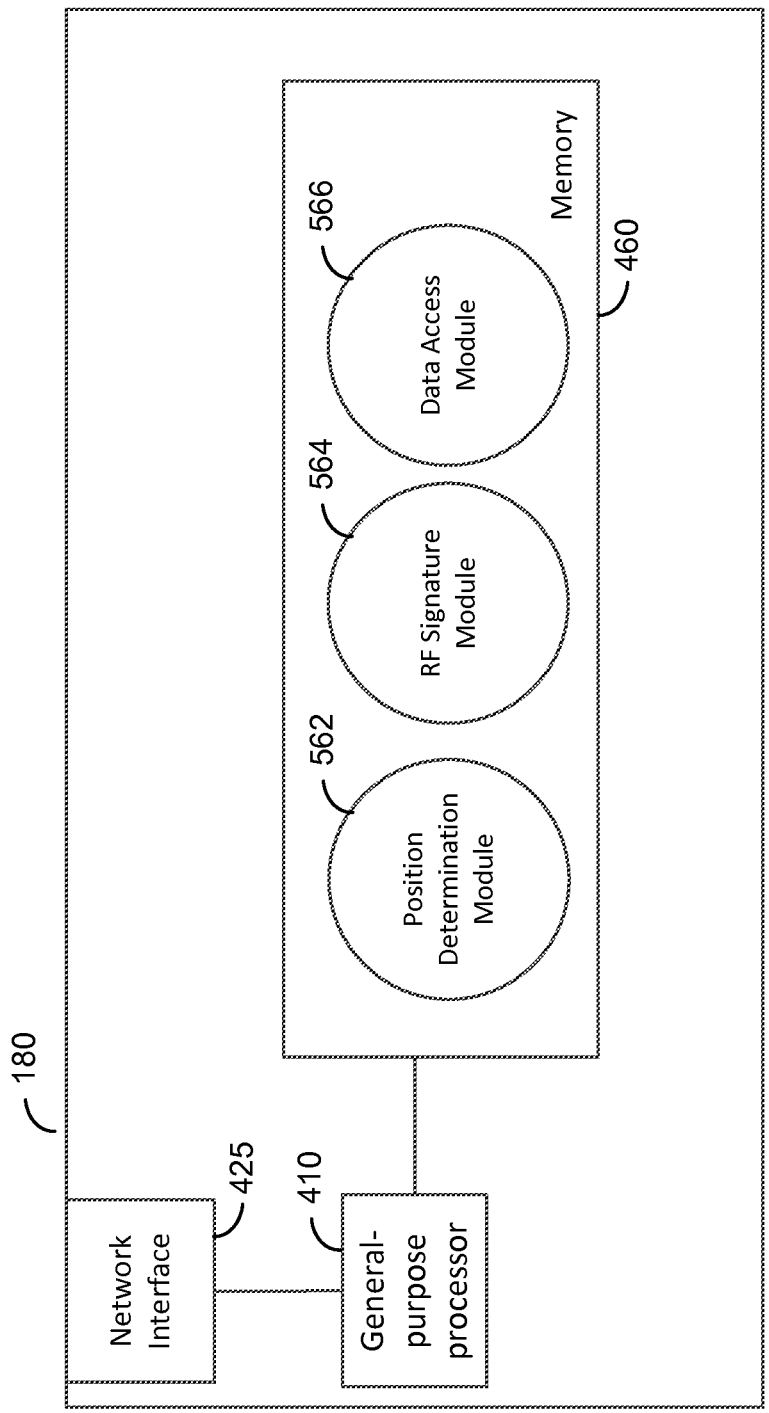
FIG. 5 is a functional block diagram of the computer system illustrated in FIG. 4 that illustrates functional modules of a memory shown in FIG. 4.

FIG. 5 is a functional block diagram of the location server 180 illustrated in FIG. 4 that illustrates functional modules of a memory 460 shown in FIG. 4. For example, the location server 180 can include position determination module 362, an RF signature module 564, and a data access module 566. The location server 180 may also include one or more additional functional modules that provide other functionality to the location server 180. The location server 180 illustrated in FIGS. 4 and 5 can be used to implement the location server associated with the processes illustrated in FIGS. 6-8.

The position determination module 562 can be configured to determine a position of the mobile device 120 and/or of one or more wireless transmitters 115. For example, the position determination module 562 can be configured to receive pseudorange data received by the mobile device 120 and/or signal measurements collected by the mobile device 120 from one or more wireless base stations 140 and/or wireless transmitters 115 and to determine a position of the mobile device 120 based on the data received from the mobile device 120. The position determination module 562 can also be configured to determine the position of a wireless transmitter 115 that has been moved based on signal information collected from one or more mobile devices 120. For example, the position determination module 562 can be configured to triangulate the position of a moved wireless transmitter 115 based on signal measurements made by one or more mobile devices 120 at known locations. The position determination module 562 can use various types of signal measurements, such as RSSI, TOA, and RTD measurements obtained by the one or more mobile devices 120 to determine the new position of the moved wireless transmitter 115. The position determination module 562 can also use measured path loss measurements obtained by the one or more mobile devices 120 to determine the new position of the moved wireless transmitter 115. The position determination module 115 can be configured to update almanac information and/or other assistance data that the location server 180 can use to determine the position of a mobile device 120 and/or provide to a mobile device 120 that the mobile device 120 can use when determining the position of the mobile device 120. The position determination module can be configured to determine the position of a mobile device 120 in response to a request from the mobile device 120, another mobile device 120, or some other network entity.

The RF signature module 564 can be configured to provide reference RF signature data to the mobile device 120. The RF signature data can comprise a signature for each of a plurality of identified wireless transmitters 115 that can be used to determine whether a candidate wireless transmitter 115 has been moved based on the presence of other wireless transmitters 115 proximate to candidate wireless transmitter. The RF signature data comprise reference signal measurements of signals collected from wireless transmitters 115 proximate to the candidate wireless transmitter 115 which can then be compared with observed measurements to determine whether the candidate wireless transmitter 115 has been moved. The RF signature data is location independent and can be used to determine whether a candidate wireless transmitter 115 has been moved without the need for location information for the candidate wireless transmitter 115 or the wireless transmitters located proximate to the candidate wireless transmitter 115. The RF signature module 564 can be configured to provide the reference RF signature data to the mobile device 120 in response to a request from the mobile device. The RF signature module 564 can also be configured to push the reference RF signature data to the mobile device 120. The RF signature module 564 can be configured to push the RF signature data to the mobile device 120 based on an approximate position of the mobile device. For example, the RF signature module 564 can be configured to push reference signature information to the mobile device 120 in response to the mobile device 120 initiating a positioning session with the location server 120. The RF signature module 564 can be configured to push reference signature information to the mobile device 120 in response to the mobile device 120 entering a predetermined geographical location, such as a shopping mall, that includes a plurality of wireless transmitters 115 from which the mobile device 120 may use signal measurements for determining a position of the mobile device 120.

The RF signature module 564 can also be configured to access reference RF signature data stored in memory 460 and/or other data storage device associated with the location server 180 via the data access module 566. The RF signature module 566 can be configured to access a stored RF signature for a candidate wireless transmitter 115 based on signal measurements received from the mobile device 120, to compare the observed RF signature for the candidate wireless transmitter 115 with a reference RF signature associated with the candidate wireless transmitter 115, and to determine whether the candidate wireless transmitter 115 has moved.

The RF signature module 564 can also be configured to provide an indicator to the position determination module 562 and/or the location server 180 that a candidate wireless transmitter 115 has been moved. The location server 180 can be configured to reinitialize the reference RF signature for the candidate wireless transmitter 115 if the candidate wireless transmitter 115 has been determined to have moved and to collect new data to build a new RF signature for the candidate wireless transmitter 115. The location server 180 can be configured to collect information from one or more mobile devices 120 and/or detection devices that the location server 180 can use to generate a new reference RF signature for the candidate wireless transmitter 115 that has been moved. The RF signature module 564 can also be configured to update the RF signature information for a candidate wireless transmitter 115 even if the candidate wireless transmitter 115 is determined to not have moved. For example, the RF signature module 564 can be configured to update the reference RF signature information for the candidate wireless transmitter 115 based on existing RF signature information for the candidate wireless transmitter 115 and observed signature information collected by the mobile device 120. Various techniques such as filtering, smoothing, averaging, weighted averaging can be applied by the RF signature module 564 to combine the existing RF signature information with observed signature information.

The RF signature module 564 can be configured to receive signal measurements from one or more mobile devices 120 and/or one or survey devices configured to obtain signal measurements from wireless transmitters 115 and to send the signal measurements to the location server 180. The mobile device 120 and/or the survey devices can be configured to generate an RF signature for a wireless transmitter 115 and to send that RF signature to the location server 180. The RF signature module can use the information obtained from the one or more mobile devices 120 and/or one or survey devices to update a reference RF signature for that wireless transmitter 115.

The RF signature module 564 can be configured to instruct the mobile device 120 to scan for wireless transmitters 115 proximate to the mobile device 120 and to collect observed RF signatures of the wireless transmitters 115 proximate to the mobile device. The RF signature module 564 can be configured to receive the observed RF signatures from the mobile device 120 and to make a determination whether one or more of the wireless transmitters 115 associated with the observed RF signatures have moved. The mobile device 120 can also be configured to make a determination whether one or more of the wireless transmitters 115 associated with the observed RF signatures have moved and to notify the RF signature module 564 if one or more of the wireless transmitters 115 have moved. For example, the RF signature module 564 can be configured instruct the mobile device 120 to perform a scan in response to a request from the mobile device 120 or another network entity, in response to a request from the positioning module 562, or in response to a user request. The RF signature module 564 can also be configured to instruct the mobile device 120 perform such a scan in response to a trigger condition being satisfied or a predetermined event occurring. For example, the RF signature module 564 can be configured to instruct the mobile device 120 to perform a scan when the mobile device 120 enters a predetermined area, such as an airport, shopping mall, train station, airport, or other location that includes a plurality of wireless transmitters 115 from which signal measurements may be used to determine a position of the mobile device 120. In some implementations, the RF signature module 564 can also be configured to instruct the mobile device 120 perform a scan in response to the positioning module 562 producing an anomalous positioning result. For example, if the positioning module 562 relied on measurements of signals received from one or more wireless transmitters 115 that have been moved but are still associated location information representing a previous location of the one or more wireless transmitters 115, the position determined by the positioning module 562 for the mobile device 120 may be incorrect.

The RF signature module 564 can be configured to use theoretical models to develop and RF signature for one or more wireless transmitters 115. In such an implementation, the location server 180 can be configured to use terrain maps, building maps, and/or other information in conjunction with theoretical signal propagation models to develop a reference RF signature for one or more wireless transmitters 115. The location server 180 can be configured to update the reference RF signatures using RF signature information received from one or more mobile device 120 and/or one or more survey devices.

The data access module 566 can be configured to store data in the memory 460 and/or other data storage devices associated with the location server 180. The data access module 566 can also be configured to access data in the memory 460 and/or other data storage devices associated with the location server 180. The data access module 566 can be configured to receive requests from other modules and/or components of the location server 180 and to store and/or access data stored in the memory 460 and/or other data storage devices associated with the location server 180.

Example Implementations

FIG. 6 is a flow diagram of a process that can be used to identify a moved wireless transmitter. The process illustrated in FIG. 6 can be implemented in the mobile device 120. The stages of FIG. 6 can be implemented by the RF signature module 364 of the mobile device 120 in combination with the assistance of the position determination module 362 and/or other modules and components of the mobile device 120.

The process can begin with obtaining at least a portion of a reference RF signature database associated with a plurality of wireless transmitters (stage 605). The reference RF signature database (also referred to herein as reference RF signature information) can be received at the mobile device 120 from the location server 180 or from another network entity. In some implementations, the r reference RF signature database may be requested by RF signature module 364 of the mobile device 120, and the location server 180 or other network entity can be configured to send the reference RF signature database to the mobile device 120. In some implementations, the reference RF signature database can be pushed to the mobile device 120 or downloaded by the mobile device 120 as part of periodic updates of data and/or other content on the mobile device 120. As discussed above, the reference RF signature information can include signal measurements, such as signal strength and/or timing measurements of signals associated with one or more wireless transmitters located proximate to the a candidate wireless transmitter. The signal measurements can be associated with wireless transmitters configured to operate using more than one type of wireless communication protocol. The reference RF signature information received at the mobile device 120 can also include RF signature data associated with a plurality of wireless transmitters. The reference RF signature data can include data that is associated with a particular geographical area in which the mobile device 120 is located. For example, the reference RF signature database can include reference RF signatures for a shopping mall, an airport, or location in which wireless transmitters are deployed and the mobile device 120 may use signal measurements from the wireless transmitters for position determination. The reference RF signature data can also comprise a grid-based regional breakdown of reference RF signature data broken up into squares and/or other shapes covering a specification geographical region, and a set of one or more portions of the RF signature data associated with a particular geographical area in which the mobile device 120 is located can be provided to the mobile device 120. In some implementations, the reference RF signature database or at least a portion of the database may be stored in a memory of the mobile device 120 and the RF signature module 364 can access the reference RF signature database or portion thereof from the memory.

Signals from the plurality of wireless transmitters proximate to the mobile device 120 can be measured by the mobile device 120 (stage 610). The mobile device 120 can be configured to perform signal strength measurements, such as RSSI, and/or timing measurements, such as TOA, OTDAO, and RTT measurements of signals from a plurality of wireless transmitters proximate to the mobile device 120. The mobile device 120 can also be configured to perform other types of signal strength measurements. The mobile device 120 can be configured to measure path loss associated signals received from the plurality of wireless transmitters proximate to the mobile device 120.

The mobile device 120 can then identify a candidate wireless transmitter of the plurality of wireless transmitter (stage 615). The candidate wireless transmitter can be selected from the plurality of wireless transmitters using various approaches. For example, the RF signature module 364 can be configured to identify each of the plurality of wireless transmitters from which signals were received in stage 610 using an identifier and/or other information transmitted by the plurality of wireless transmitters. The RF signature module 364 can be configured to identify a candidate wireless transmitter for which an observed RF signature will be generated a determination made whether the candidate wireless transmitter has been moved. In some implementations, the RF signature module 364 can be configured to order the identified wireless transmitters proximate to the mobile device 120 by signal strength and to select a candidate wireless transmitter having a strongest signal strength. In other implementations, the RF signature module 364 can be configured to order the identified wireless transmitters proximate to the mobile device 120 by distance from the mobile device 120. For example, the distance from the mobile device 120 can be determined based on timing measurements for signals received from the plurality of wireless transmitters or based on a known position of the mobile device and almanac information identifying the locations of wireless transmitters (which could be out of date if one or more wireless transmitters have moved). The RF signature module 364 can also be configured to use a round robin approach or other similar approach for selecting a candidate wireless transmitter. The process illustrated in FIG. 6 may be repeated from stage 615 onward if where there are multiple candidate wireless transmitters proximate to the mobile device so that the RF signature module 364 can make a determination whether each of the wireless transmitters has been moved.

The RF signature module 364 can be configured to select a candidate wireless transmitter that is included in the reference RF signature information received in stage 605. The RF signature module 364 can also be optionally configured to identify any wireless transmitters that were associated with the signal measurements collected in stage 610 and to create a reference RF signature for each of those wireless transmitters. The new reference RF signatures can be transmitted to the location server 180 or to another network entity and/or stored in the memory 260 of the mobile device 120.

The RF signature module 364 can be configured to distinguish between wireless transmitters that are wireline access points and mobile wireless access points and to not select mobile wireless access points as a candidate wireless transmitter, because mobile wireless access points may move often and the position determination module 362 would typically be configured to not use signals from mobile wireless access points for position determination. As discussed above, various techniques can be employed to determine whether a wireless transmitter is mobile wireless access point, including: (1) comparing the MAC address or other unique identifier associated with the wireless access point to a MAC addresses of known wireless access points, (2) identifying signals transmitted by the wireless transmitter that indicate that the wireless transmitter is a mobile wireless access point, (3) determining that the wireless transmitter has moved more than a predetermined number of times, and/or (4) determining that the wireless transmitter has move more than a predetermined number of times over a predetermined period of time. The RF signature module 364 can also be configured not to use signals from a mobile wireless transmitter, such as a mobile WAN hotspot, when generating a reference RF signature for a particular candidate wireless transmitter, as the mobile wireless transmitter is likely to move, which could result in a false determination that the candidate wireless transmitter has moved.

An observed RF signature for candidate wireless transmitter can then be derived from the signals measured by the mobile device 120 (stage 625). The RF signature module 364 can be configured to generate the observed RF signature for the candidate wireless transmitter. The observed RF signature for the candidate can be generated by the RF signature module 364 using signal measurements collected in stage 610 by excluding signal measurements associated with the candidate wireless transmitter. In some implementations, the RF signature module 364 can be configured to only use signal measurements collected in stage 610 from wireless transmitters or transmitters that were included in the reference RF signature module 364 associated with the candidate wireless transmitter. In some implementations, the RF signature module 364 can be configured to use the signal measurements collected in stage 610 that were included in the RF signature as well as a signal measurements for some or all of the other wireless transmitters or transceivers from which signals have been collected were not included in the RF signature for the candidate wireless transmitter.

The reference RF signature for the candidate wireless transmitter can then be compared to the observed RF signature for the candidate wireless transmitter (stage 630). The reference RF signature for the candidate wireless transmitter can be accessed by the RF signature module 364. The reference RF signature information may be stored in the memory 260 of the mobile device 120, and the RF signature module 364 can be configured to request that the data access module 366 retrieve the RF signature information from the memory 260 via the data access module 366. The RF signature module 364 can then compare the reference RF signature for the candidate wireless transmitter to the observed RF signature for the candidate wireless transmitter derived in stage 625. The RF signature can be derived from RSSI (Received Signal Strength Indication) measurements associated with signals produced by the other wireless transmitters proximate to the candidate wireless transmitter for which the RF signature is being generated. The reference RF signature for the candidate wireless transmitter can also be derived from measured path loss associated signals produced by the other wireless transmitters proximate to the candidate wireless transmitter for which the RF signature is being generated. In some implementations, the reference RF signature information can comprise a combination of RSSI, path loss, and/or other information, such as RTT information, that can be used to determine the proximity of a candidate wireless transmitter to one or more other wireless transmitters at the time that the reference RF signature was generated.

A determination whether the candidate wireless transmitter has changed locations can be made (stage 635). An example process for determining whether a candidate wireless transmitter changed locations is illustrated in FIG. 7. The RF signature module 364 of the mobile device 120 can be configured to take into account one or more of the following factors when determining whether the candidate wireless transmitter has changed locations: (1) are there different wireless transmitters or transmitters proximate to the candidate wireless transmitter; (2) have more than a threshold number or percentage of wireless transmitters or transmitters proximate to the candidate wireless transmitter changed; (3) have the signal measurements for the wireless transmitters or transmitters included in the reference RF signature and the observed RF signature changed; and (4) have the changes between the signal measurements associated with the observed and reference RF signatures exceeded a predetermined threshold. These are examples of some of the factors that the RF signature module 364 may consider when determining whether the location of the candidate wireless transmitter has changed. Other factors in addition to or instead of those discussed above may also be considered.

In some implementations, the reference RF signature information can comprise a range of RSSI values, and if the observed RF signature information falls outside of that range, then that weighs in favor of the candidate wireless transmitter 115 having moved. In an example to illustrate this concept, the RF signature information for the candidate wireless transmitter 115 includes a second wireless transmitter 115. At least a portion of the coverage area of the candidate wireless transmitter 115 and at least a portion of the coverage area of the second wireless transmitter 115 can overlap such that the mobile device 120 can detect signals from both the candidate wireless transmitter 115 and the second wireless transmitter 115 when located within the overlapping portion of the coverage areas. The mobile device 120 may located anywhere within this overlapping portion, and thus, the distance between the mobile device 120 and the second wireless transmitter 115 can also change. Accordingly, the RSSI values may fall within a range of values. For example, the RSSI range for the second wireless access point in this example might be −80 dBm to −98 dBM. The RSSI values for the range could also be expressed as a reference RSSI value plus or minus a threshold value. For example, the RSSI value for the second wireless transmitter 115 used in the preceding example could expressed as a reference RSSI value of −89 dBM plus or minus a 9 dBm threshold. The specific RSSI range values, RSSI reference values, and threshold amount used in this example are intended to illustrate the concepts discussed herein. The RSSI range values, RSSI reference value, and threshold values can vary and depend at least in part on the how close the candidate wireless transmitter 115 is to the other wireless transmitter included in the reference RF signature information. As described above, in some implementations, the reference RF signature information can comprise path loss information instead of or in addition to the RSSI information or other signal information that can be used to determine whether a candidate wireless transmitter has been moved.

If the location of the candidate wireless transmitter has changed, an indicator that the candidate wireless transmitter has been moved can be generated (stage 645). The RF signature module 364 can be configured to generate the indicator that the candidate wireless transmitter has been moved. The RF signature module 364 can be configured to provide the indicator to one or more modules of the mobile device 120, such as the position determination module 362, and/or configured to send the indicator that the candidate wireless transmitter has been moved to the location server 180 and/or to other network elements. The RF signature module 364 of the mobile device 120 can be configured to update the RF signature information in memory 260 to indicate that the candidate wireless transmitter 115 has been moved. For example, the RF signature module 364 can be configured to add an indicator to the RF signature data associated with the candidate wireless transmitter 115 that indicates that the candidate wireless transmitter 115 has moved. The positioning module 362 can be configured to access the RF signature data prior to making a position determination and can be configured to exclude any wireless transmitters 115 that have moved been moved and for which a new position has not yet been determined by the location server 180. The RF signature module 364 can also be configured to send a message to the location server 180 and/or another network entity indicating that the mobile device 120 has determined that the candidate wireless transmitter 115 has been moved. The RF signature module 364 of the mobile device can also be configured to send the updated RF signature information to the location server and/or another network entity, which can be configured to provide the updated RF signature information to other mobile devices 120.

If the location of the candidate wireless transmitter has not changed, an indicator that the candidate wireless transmitter has not been moved can be generated (stage 640). The RF signature module 364 can be configured to generate the indicator that the candidate wireless transmitter has been moved.

the RF signature information for the candidate wireless transmitter can be updated to indicate that the wireless transmitter has not moved. For example, the RF signature module 364 can be configured to update a timestamp on the RF signature information in memory 260 and/or wireless transmitter location information in memory 260 indicating that the candidate wireless transmitter has not moved. The positioning module 260 can be configured to use the timestamp information to allow the positioning module to collect signal measurements from wireless transmitters the positions of which have been verified most recently when determining a position of the mobile device 120. The RF signature module 364 can also send the timestamp information to the location server and/or other network entity so that wireless transmitter location information maintained by the location server 180 and/or the other network entity may be updated to indicate that the location of the candidate wireless transmitter has been verified.

FIG. 7 is a flow diagram of a process that can be used to determine whether a candidate wireless transmitter has moved. The process illustrated in FIG. 7 can be used to implement stage 635 of the process illustrated in FIG. 6. The process illustrated in FIG. 7 can be implemented by the RF signature module 364 of the mobile device 120. The process illustrated in FIG. 7 can also be implemented by the RF signature module 564 of the location server 180 to determine whether a candidate wireless transmitter has moved based on RF signal measurements collected by the mobile device 120 and transmitted to the location server 180.

At least one identifiers associated with at least one the wireless transmitters included in the observed RF signature data can be compared with at least one identifier associated with the wireless transmitters included in the reference RF signature data associated with a candidate wireless transmitter (stage 705), and a determination can be made whether the observed RF signature and the reference RF signature include different wireless transmitters (stage 710). If the candidate wireless transmitter has moved, the wireless transmitters proximate to the candidate wireless transmitter are likely to change and the identifiers associated with the wireless transmitters included in the reference RF signature and the observed RF signature are likely to differ. If the wireless transmitters associated with the reference RF signature and the observed RF signature do not differ, then the process can continue with stage 750.

If the wireless transmitters associated with the observed and reference RF signatures identification differ, a determination can be made whether the number of wireless transmitters 115 (and/or wireless base stations 140) observed differ from the number included in the reference RF signature exceed a threshold amount (stage 715). The threshold can be defined such that minor changes to the network environment, such as a neighboring wireless transmitter being moved, going offline, or being reconfigured with a new identifier will not cause a candidate wireless access point to be flagged as having moved. For example, the threshold could be defined a number of wireless transmitters or a percentage of wireless transmitters associated with the reference RF signature that can differ between the observed and reference RF signatures without causing the candidate wireless transmitter to be flagged as having been moved.

If the threshold number of differences between the observed and reference RF signatures has been exceeded, the candidate transmitter can be flagged as having been moved (stage 720). If the process illustrated in FIG. 7 is being implemented in the mobile device 120, the RF signature module 364 of the mobile device 120 can update the RF signature information associated with the candidate wireless transmitter to indicate that the candidate wireless transmitter has moved. If the process illustrated in FIG. 7 is being implemented in the mobile device 120, the RF signature module 564 of the location server 180 can update the RF signature information associated with the candidate wireless transmitter to indicate that the candidate wireless transmitter has moved. If the threshold number of differences between the observed and reference RF signatures has not been exceeded, the process can continue with stage 750.

The observed RF signature for the candidate wireless transmitter 115 can be compared with the reference RF signature (stage 750), and a determination can be made whether the observed and reference RF signatures differ (stage 755). The RF signature module 364 of the mobile device 120 (or the RF signature module 564 of the location server 180 where the process is implemented by the location server 180) can be configured to compare observed signal measurements, which may include signal strength measurements, such as RSSI, and/or timing measurements, such as RTT and TOA, with measurements included in the reference RF signature to determine whether the candidate wireless transmitter 115 has moved. The RF signature module 364 can also be configured to compare path loss information to determine whether the candidate wireless transmitter 115 has been moved. The RF signature module 364 of the mobile device 120 or the RF signature module 564 of the location server 180 can be configured to compare the observed and reference RF measurements and to make a determination that the candidate wireless transmitter 115 has moved if one or more of the RF measurements associated with the observed RF signature differ from the RF measurements associated with the reference RF signature by a threshold amount.

If the observed and reference RF signatures differ, the process can continue with stage 720. Otherwise, the process can continue with stage 730 where the candidate wireless transmitter can be identified as having not moved. The reference RF signature information can be updated with a timestamp indicating that the location of the candidate wireless transmitter has been verified based on the RF signature. The position determination module 362 of the mobile device 120 and the position determination module 562 of the location server 180 can be configured to use the timestamp information when selecting from which wireless transmitters signals may be used when determining a position of the mobile device 120.

FIG. 8 is a flow diagram of a process that can be used to update a reference RF signature associated with a wireless access point. The process illustrated in FIG. 8 can be implemented by the location server 180. The RF signature module 564 of the location server 180 can be configured to implement the process of FIG. 8. The process illustrated in FIG. 8 can be used by the location server 180 to take a crowdsourcing approach to updating the RF signature models maintained by the location server 180. Mobile devices 120 can report changes to the reference RF signatures associated with a wireless transmitters 115 as the mobile devices determine that the wireless transmitters 115 have been moved, and the location server 180 can be configured to update a database of reference RF signature data based on the information provided by the mobile devices 120.

The method illustrated in FIG. 8 provides an example of one technique that can be used to update reference RF signature information. In some implementations, the location server 180 can be configured to receive changes to reference RF signatures associated with a wireless transmitters 115 from one or more survey devices that move through an area of interest and collect data that can be used to determine an RF signature for one or more wireless transmitters and provide RF signature information to the location server 180. Furthermore, in some implementations, mobile devices 120 and one or more survey devices can be configured to provide the location server 180 with updated RF signature information. In some implementations, the location server 180 can be configured to use theoretical models to develop and RF signature for one or more wireless transmitters 115. In such an implementation, the location server 180 can be configured to use terrain maps, building maps, and/or other information in conjunction with theoretical signal propagation models to develop a reference RF signature for one or more wireless transmitters 115. The location server 180 can be configured to update the reference RF signatures using RF signature information received from one or more mobile device 120 and/or one or more survey devices.

The location server 180 can receive RF signature information for a candidate wireless transmitter 115 from the mobile device 120 (stage 1105). The mobile device 120 can be configured to determine a reference RF signature for a newly identified wireless transmitter 115 and to send the RF signature to the location server 180. The mobile device 120 can also be configured to determine an updated reference RF signature for a wireless transmitter 115 that has been moved and can send the updated RF signature to the location server 180.

An RF signature database can be updated with the received RF signature information (stage 1110). The RF signature module 564 of the location server 180 can be configured to determine whether a database of reference RF signature information maintained by the location server 180 includes a reference RF signature for the candidate wireless transmitter 115. If the RF signature module 564 determines that the database does not include an RF signature for the candidate wireless transmitter 115, the RF signature module 564 can add the reference RF signature to the reference RF signature database. If the RF signature module 564 determines that the database includes a reference RF signature for the candidate wireless transmitter 115, the RF signature module 564 can update the existing record. In some implementations, the RF signature module 564 can be configured to only update the reference RF signature associated with a particular wireless transmitter 115 if a threshold number of mobile devices 120 report that the RF signature associated with the wireless transmitter 115 has changed. In some implementations, the RF signature module 564 can be configured to identify one or more mobile devices 120 that are located proximate to the candidate wireless transmitter 115 and to send a request to those mobile device 120 to collect and observed RF signature for the candidate wireless transmitter 115. The position determination module 562 can be configured to provide the identity of mobile devices that are proximate to a last known location of the candidate wireless access point 115. The RF signature module 564 can be configured to compare the observed RF signatures for the candidate wireless access point to determine whether it appears that the RF signature of the candidate wireless transmitter 115 has changed. However, if the candidate wireless transmitter 115 has been moved to a new location that is remote from the last known location of the candidate wireless transmitter 115, the location server 180 may not receive any results back from the request, which can indicate that the position of the candidate wireless transmitter 115 has changed significantly.

Updated reference RF signature information may then optionally be provided to one or more mobile devices 120 (stage 1115). The RF signature module 564 can be configured to send the updated RF signature information associated with the candidate wireless transmitter 115 to one or more mobile devices 120. The RF signature module 564 can be configured to push the data out to mobile devices 120 that are determined to be proximate to the new or old locations of the candidate wireless transmitter 115 and may be able to benefit from the updated RF signature information. The RF signature module 565 can also be configured to respond to requests from mobile device 120 for RF signature information and to provide the RF signature information to the requesting mobile devices 120.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for identifying, using a mobile device, that a wireless transmitter has been moved, the method comprising:
   measuring, at the mobile device, signals from a plurality of wireless transmitters proximate to the mobile device;
   identifying, at the mobile device, a candidate wireless transmitter from the plurality of wireless transmitters, wherein identifying the candidate wireless transmitter comprises determining whether a wireless transmitter of the plurality of wireless transmitters is a mobile wireless access point by determining whether the wireless transmitter has moved more than a predetermined number of times over a predetermined period of time, and identifying the wireless transmitter as the candidate wireless transmitter responsive to the wireless transmitter not being a mobile wireless access point;
   obtaining, at the mobile device, a reference radio frequency (RF) signature associated with the candidate wireless transmitter, the reference RF signature comprising location-independent information associated with the candidate wireless transmitter;
   deriving, at the mobile device, an observed radio frequency (RF) signature for the candidate wireless transmitter from the measured signals of at least one wireless transmitter of the plurality of wireless transmitters other than the candidate wireless transmitter;
   determining, at the mobile device, whether the candidate wireless transmitter has been moved to a new location by comparing the observed RF signature for the candidate wireless transmitter to the reference RF signature associated with the candidate wireless transmitter; and
   generating, at the mobile device, an indicator indicative of whether the candidate wireless transmitter has been moved.

2. The method of claim 1, wherein obtaining the reference RF signature further comprises:
   receiving, at the mobile device, the reference RF signature from a location server.

3. The method of claim 1, wherein obtaining the reference RF signature further comprises:
   accessing the reference RF signature in a memory of the mobile device.

4. The method of claim 1, further comprising:
   sending the indicator to a location server responsive to the indicator indicating that the candidate wireless transmitter has moved.

5. The method of claim 1 wherein determining whether the candidate wireless transmitter has been moved to the new location by comparing the observed RF signature for the candidate wireless transmitter to the reference RF signature associated with the candidate wireless transmitter further comprises:
   comparing at least one identifier associated with at least one wireless transmitter of the plurality of wireless transmitters other than the candidate wireless transmitter with at least one identifier of at least one wireless transmitter associated with the reference RF signature.

6. The method of claim 1 wherein the reference RF signature and the observed RF signature are derived based on at least one of a received signal strength or measured path loss associated with the at least one wireless transmitter of the plurality of wireless transmitters.

7. The method of claim 1 wherein determining whether the candidate wireless transmitter has been moved to the new location by comparing the observed RF signature for the candidate wireless transmitter to the reference RF signature associated with the candidate wireless transmitter further comprises:
   comparing a first distance from the candidate wireless transmitter associated with the reference RF signature at which the reference RF signature was generated with a second distance from the candidate wireless transmitter associated with the observed RF signature at which the observed RF signature was generated.

8. The method of claim 1, further comprising:
   adjusting a weight associated with the candidate wireless transmitter in response to the indicator indicating that the candidate wireless transmitter has moved, the weight indicative of a reliability of a location associated with the candidate wireless transmitter.

9. The method of claim 1, further comprising determining a new position of the candidate wireless transmitter at the mobile device responsive to the indicator that the candidate wireless transmitter has moved.

10. An apparatus for identifying, using a mobile device, that a wireless transmitter has been moved, the apparatus comprising a memory and a processor, the apparatus further comprising:
    means for measuring signals, at the mobile device, from a plurality of wireless transmitters proximate to the mobile device;
    means for identifying, at the mobile device, a candidate wireless transmitter from the plurality of wireless transmitters, wherein the means for identifying the candidate wireless transmitter comprises means for determining whether a wireless transmitter of the plurality of wireless transmitters is a mobile wireless access point by determining whether the wireless transmitter has moved more than a predetermined number of times over a predetermined period of time and means for identifying the wireless transmitter as the candidate wireless transmitter responsive to the wireless transmitter not being a mobile wireless access point;
    means for obtaining, at the mobile device, a reference radio frequency (RF) signature associated with the candidate wireless transmitter, the reference RF signature comprising location-independent information associated with the candidate wireless transmitter;
    means for deriving, at the mobile device, an observed radio frequency (RF) signature for the candidate wireless transmitter from the measured signals of at least one wireless transmitter of the plurality of wireless transmitters other than the candidate wireless transmitter;
    means for determining, at the mobile device, whether the candidate wireless transmitter has been moved to a new location by comparing the observed RF signature for the candidate wireless transmitter to the reference RF signature associated with the candidate wireless transmitter; and means for generating, at the mobile device, an indicator indicative of whether the candidate wireless transmitter has been moved.

11. The apparatus of claim 10, further comprising:
means for receiving, at the mobile device, the reference RF signature from a location server.

12. The apparatus of claim 10 wherein the means for obtaining the reference RF signature further comprises:
means for accessing the reference RF signature in a memory of the mobile device.

13. The apparatus of claim 10, further comprising:
means for sending the indicator to a location server responsive to the indicator indicating that the candidate wireless transmitter has moved.

14. The apparatus of claim 10 wherein the means for determining whether the candidate wireless transmitter has been moved to the new location by comparing the observed RF signature for the candidate wireless transmitter to the reference RF signature associated with the candidate wireless transmitter further comprises:
means for comparing at least one identifier associated with at least one wireless transmitter of the plurality of wireless transmitters other than the candidate wireless transmitter with at least one identifier of at least one wireless transmitter associated with the reference RF signature.

15. The apparatus of claim 10 wherein the means for determining whether the candidate wireless transmitter has been moved to the new location by comparing the observed RF signature for the candidate wireless transmitter to the reference RF signature associated with the candidate wireless transmitter further comprises:
means for comparing a first distance from the candidate wireless transmitter associated with the reference RF signature at which the reference RF signature was generated with a second distance from the candidate wireless transmitter associated with the observed RF signature at which the observed RF signature was generated.

16. The apparatus of claim 10, further comprising:
means for adjusting a weight associated with the candidate wireless transmitter in response to the indicator indicating that the candidate wireless transmitter has moved, the weight indicative of a reliability of a location associated with the candidate wireless transmitter.

17. The apparatus of claim 10, further comprising means for determining a new position of the candidate wireless transmitter at the mobile device responsive to the indicator that the candidate wireless transmitter has moved.

18. A mobile device for identifying that a wireless transmitter has been moved, the mobile device comprising:
a tangible, non-transitory computer-readable memory;
a plurality of modules comprising processor executable code stored in the memory;
a processor connected to the memory and configured to access the plurality of modules stored in the memory; and
a radio frequency (RF) signature module configured to measure signals from a plurality of wireless transmitters proximate to the mobile device;
identify a candidate wireless transmitter from the plurality of wireless transmitters, wherein the RF signature module is configured to determine whether a wireless transmitter of the plurality of wireless transmitters is a mobile wireless access point by determining whether the wireless transmitter has moved more than a predetermined number of times over a predetermined period of time, and identify the wireless transmitter as the candidate wireless transmitter responsive to the wireless transmitter not being a mobile wireless access point;
obtain a reference radio frequency (RF) signature associated with the candidate wireless transmitter, the reference RF signature comprising location-independent information associated with the candidate wireless transmitter;
derive an observed radio frequency (RF) signature for the candidate wireless transmitter from the measured signals of at least one wireless transmitter of the plurality of wireless transmitters other than the candidate wireless transmitter;
determine whether the candidate wireless transmitter has been moved to a new location by comparing the observed RF signature for the candidate wireless transmitter to the reference RF signature associated with the candidate wireless transmitter; and
generate an indicator indicative of whether the candidate wireless transmitter.

19. The mobile device of claim 18 wherein the RF signature module is configured to receive the reference RF signature from a location server.

20. The mobile device of claim 18 wherein the RF signature module is configured to access the reference RF signature in a memory of the mobile device.

21. The mobile device of claim 18 wherein the RF signature module is further configured to:
send the indicator to a location server responsive to the indicator indicating that the candidate wireless transmitter has moved.

22. The mobile device of claim 18 wherein the RF signature module being configured to determine whether the candidate wireless transmitter has been moved to the new location is further configured to:
compare at least one identifier associated with at least one wireless transmitter of the plurality of wireless transmitters other than the candidate wireless transmitter with at least one identifier of at least one wireless transmitter associated with the reference RF signature.

23. The mobile device of claim 18 wherein the reference RF signature and the observed RF signature are derived based on at least one of a received signal strength or measured path loss associated with the at least one wireless transmitter of the plurality of wireless transmitters.

24. The mobile device of claim 18 wherein the RF signature module being configured to determine whether the candidate wireless transmitter has been moved to the new location by comparing the observed RF signature for the candidate wireless transmitter to the reference RF signature associated with the candidate wireless transmitter is further configured to:
compare a first distance from the candidate wireless transmitter associated with the reference RF signature at which the reference RF signature was generated with a second distance from the candidate wireless transmitter associated with the observed RF signature at which the observed RF signature was generated.

25. A non-transitory computer-readable medium, having stored thereon computer-readable instructions for identifying, using a mobile device, that a wireless transmitter has been moved, comprising instructions configured to cause at least one processor to:

measure, at the mobile device, signals from a plurality of wireless transmitters proximate to the mobile device;

identify, at the mobile device, a candidate wireless transmitter from the plurality of wireless transmitters, wherein the instructions configured to cause the computer to identify the candidate wireless transmitter comprise instructions configured to cause the computer to determine whether a wireless transmitter of the plurality of wireless transmitters is a mobile wireless access point by determining whether the wireless transmitter has moved more than a predetermined number of times over a predetermined period of time, and to identify the wireless transmitter as the candidate wireless transmitter responsive to the wireless transmitter not being a mobile wireless access point;

obtain, at the mobile device, a reference radio frequency (RF) signature associated with the candidate wireless transmitter, the reference RF signature comprising location-independent information associated with the candidate wireless transmitter;

derive, at the mobile device, an observed radio frequency (RF) signature for the candidate wireless transmitter from the measured signals of at least one wireless transmitter of the plurality of wireless transmitters other than the candidate wireless transmitter;

determine, at the mobile device, whether the candidate wireless transmitter has been moved to a new location by comparing the observed RF signature for the candidate wireless transmitter to the reference RF signature associated with the candidate wireless transmitter; and generate, at the mobile device, an indicator indicative of whether the candidate wireless transmitter has been moved.

26. The non-transitory computer-readable medium of claim 25, wherein the instructions configured to cause the at least one processor to obtain the reference RF signature further comprise instructions configured to cause the at least one processor to:

receive the reference RF signature from a location server.

27. The non-transitory computer-readable medium of claim 25, wherein the instructions configured to cause the at least one processor to obtain the reference RF signature further comprise instructions configured to cause the at least one processor to:

access the reference RF signature in a memory of the mobile device.

28. The non-transitory computer-readable medium of claim 25, further comprising instructions configured to cause the at least one processor to:

send the indicator to a location server responsive to the indicator indicating that the candidate wireless transmitter has moved.

29. The non-transitory computer-readable medium of claim 25 wherein the instructions configured to cause the at least one processor to determine whether the candidate wireless transmitter has been moved to the new location by comparing the observed RF signature for the candidate wireless transmitter to the reference RF signature associated with the candidate wireless transmitter further comprise instructions configured to cause the at least one processor to:

compare at least one identifier associated with at least one wireless transmitter of the plurality of wireless transmitters other than the candidate wireless transmitter with at least one identifier of at least one wireless transmitter associated with the reference RF signature.

30. The non-transitory computer-readable medium of claim 25 wherein the instructions configured to cause the at least one processor to determine whether the candidate wireless transmitter has been moved to the new location by comparing the observed RF signature for the candidate wireless transmitter to the reference RF signature associated with the candidate wireless transmitter further comprise instructions configured to cause the at least one processor to:

compare a first distance from the candidate wireless transmitter associated with the reference RF signature at which the reference RF signature was generated with a second distance from the candidate wireless transmitter associated with the observed RF signature at which the observed RF signature was generated.

* * * * *

UNITED STATES PATENT AND TRADEMARK OFFICE
CERTIFICATE OF CORRECTION

PATENT NO. : 9,439,168 B2
APPLICATION NO. : 14/284860
DATED : September 6, 2016
INVENTOR(S) : Douglas Neal Rowitch It is certified that error appears in the above-identified patent and that said Letters Patent is hereby corrected as shown below:

In the Claims

Claim 18, Column 30, Lines 26-27, replace "generate an indicator indicative of whether the candidate wireless transmitter." with "generate an indicator indicative of whether the candidate wireless transmitter has been moved."

Signed and Sealed this
Twenty-ninth Day of May, 2018

Andrei Iancu
*Director of the United States Patent and Trademark Office*